(12) United States Patent
Dutta

(10) Patent No.: US 11,616,715 B2
(45) Date of Patent: Mar. 28, 2023

(54) STATELESS MULTICAST WITH TRAFFIC ENGINEERING

(71) Applicant: Nokia Solutions and Networks Oy, Espoo (FI)

(72) Inventor: Pranjal Kumar Dutta, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 155 days.

(21) Appl. No.: 16/994,858

(22) Filed: Aug. 17, 2020

(65) Prior Publication Data

US 2022/0052939 A1 Feb. 17, 2022

(51) Int. Cl.
| | |
|---|---|
| *H04L 45/16* | (2022.01) |
| *H04L 45/302* | (2022.01) |
| *H04L 45/00* | (2022.01) |
| *H04L 45/48* | (2022.01) |
| *H04L 45/64* | (2022.01) |
| *H04L 47/125* | (2022.01) |

(52) U.S. Cl.
CPC ............ *H04L 45/16* (2013.01); *H04L 45/302* (2013.01); *H04L 45/34* (2013.01); *H04L 45/48* (2013.01); *H04L 45/64* (2013.01); *H04L 47/125* (2013.01)

(58) Field of Classification Search
None
See application file for complete search history.

(56) References Cited

U.S. PATENT DOCUMENTS

| | | | |
|---|---|---|---|
| 7,778,235 B2* | 8/2010 | Thubert ............... | H04L 45/025 370/328 |
| 2010/0061269 A1* | 3/2010 | Banerjee ................ | H04L 47/15 370/254 |
| 2016/0254991 A1* | 9/2016 | Eckert ................ | H04L 12/4633 370/225 |
| 2019/0020738 A1* | 1/2019 | Paul ....................... | H04L 45/58 |
| 2020/0119991 A1 | 4/2020 | Dutta | |
| 2021/0306167 A1* | 9/2021 | Dutta ..................... | H04L 45/16 |

OTHER PUBLICATIONS

EP Search Report mailed in corresponding EP Application No. 21187225.4 dated Nov. 19, 2021, 13 pages.

(Continued)

*Primary Examiner* — Xavier S Wong
(74) *Attorney, Agent, or Firm* — Tong, Rea, Bentley & Kim, LLC

(57) ABSTRACT

Various example embodiments for supporting stateless multicast in communication networks are presented. Various example embodiments for supporting stateless multicast in communication networks may be configured to support stateless multicast in a packet distribution network that supports traffic engineering (TE). Various example embodiments for supporting stateless multicast in a packet distribution network that supports TE may be configured to support stateless multicast in a stateless multicast domain with TE. Various example embodiments for supporting stateless multicast in a stateless multicast domain with TE may be configured to support stateless multicast in a stateless IP multicast domain with TE, which may be referred to herein as a stateless IP multicast TE domain.

22 Claims, 20 Drawing Sheets

(56) References Cited

OTHER PUBLICATIONS

Chen, H., et al., "SRv6 Point-to-Multipoint Path," IETF Network Working Group, draft-chen-pim-srv6-2mp-path-00, Jul. 12, 2020, 13 pages.
Fenner, B., et al., "Protocol Independent Multicast—Sparse Mode (PIM-SM): Protocol Specification (Revised)," Internet EngineeringTask Force (IETF), RFC 7761, Mar. 2016, 137 pages.
Cain, B., et al., "Internet Group Management Protocol, Version 3," Network Working Group, RFC 3376, Oct. 2002, 53 pages.
Rosen, E., et al., "Multicast in MPLS/BGP IP VPNs," Internet EngineeringTask Force (IETF), RFC 6513, Feb. 2012, 88 pages.
Aggarwal, R., et al., "BGP Encodings and Procedures for Multicast in MPLS/BGP IP VPNs," Internet EngineeringTask Force (IETF), RFC 6514, Feb. 2012, 59 pages.
Wijnands, I.J., et al., "Multicast Using Bit Index Explicit Replication (BIER)," Internet EngineeringTask Force (IETF), RFC 8279, Nov. 2017, 43 pages.
Sajassi, A., et al., "BGP MPLS-Based Ethernet VPN," Internet Engineering Task Force (IETF), RFC 7432, 56 pages.
Aggarwal, R., et al., "Multicast in Virtual Private LAN Service (VPLS)," Internet EngineeringTask Force (IETF), RFC 7117, Feb. 2014, 50 pages.
Filsfils, C., et al., "Segment Routing Architecture," Internet EngineeringTask Force (IETF), RFC 8402, Jul. 2018, 32 pages.
Iana, "Internet Protocol Version 4 (IPv4) Parameters," https://www.iana.org/assignments/ip-parameters/ip-parameters.xhtml, printed on Aug. 17, 2020, 4 pages.
Iana, "Internet Protocol Version 6 (IPv6) Parameters," https://www.iana.org/assignments/ipv6-parameters/ipv6-parameters.xhtml#extension-header, printed on Aug. 17, 2020, 6 pages.

\* cited by examiner

*FIG. 2A*

| IP ROUTE TABLE 111-1 | |
|---|---|
| IP-PREFIX | NEXT-HOP |
| IP-1/xx | Self |
| IP-2/xx | R1->R2 |
| IP-3/xx | R1->R6 |
| IP-4/xx | R1->R6 |
| IP-5/xx | R1->R5 |
| IP-6/xx | R1->R6 |
| IP-7/xx | R1->R5 |
| IP-8/xx | R1->R6 |
| ... | ... |
| IP-21/yy | R1->R2 |
| .... | .... |
| IP-51/yy | R1->R5 |
| ..... | ..... |
| IP-61/yy | R1->R6 |
| ..... | ..... |

*FIG. 2B*

| IP ROUTE TABLE 111-2 | |
|---|---|
| IP-PREFIX | NEXT-HOP |
| IP-1/xx | R2->R1 |
| IP-2/xx | Self |
| IP-3/xx | R2->R5 |
| IP-4/xx | R2->R6 |
| IP-5/xx | R2->R5 |
| IP-6/xx | R2->R6 |
| IP-7/xx | R2->R5 |
| IP-8/xx | R2->R6 |
| ... | ... |
| IP-12/yy | R2->R1 |
| .... | .... |
| IP-52/yy | R2->R5 |
| ..... | ..... |
| IP-62/yy | R2->R6 |
| ..... | ..... |

*FIG. 2C*

| IP ROUTE TABLE 111-3 | |
|---|---|
| IP-PREFIX | NEXT-HOP |
| IP-1/xx | R3->R7 |
| IP-2/xx | R3->R7 |
| IP-3/xx | Self |
| IP-4/xx | R3->R4 |
| IP-5/xx | R3->R7 |
| IP-6/xx | R3->R8 |
| IP-7/xx | R3->R7 |
| IP-8/xx | R3->R8 |
| ... | ... |
| IP-43/yy | R3->R4 |
| .... | .... |
| IP-73/yy | R3->R7 |
| ..... | ..... |
| IP-83/yy | R3->R8 |
| ..... | ..... |

*FIG. 2D*

| IP ROUTE TABLE 111-4 | |
|---|---|
| IP-PREFIX | NEXT-HOP |
| IP-1/xx | R4->R8 |
| IP-2/xx | R4->R7 |
| IP-3/xx | R4->R3 |
| IP-4/xx | Self |
| IP-5/xx | R4->R7 |
| IP-6/xx | R4->R8 |
| IP-7/xx | R4->R7 |
| IP-8/xx | R4->R8 |
| ... | ... |
| IP-34/yy | R4->R3 |
| .... | .... |
| IP-74/yy | R4->R7 |
| ..... | ..... |
| IP-84/yy | R4->R8 |
| ..... | ..... |

*FIG. 2E*

| IP ROUTE TABLE 111-5 ||
|---|---|
| IP-PREFIX | NEXT-HOP |
| IP-1/xx | R5->R1 |
| IP-2/xx | R5->R2 |
| IP-3/xx | R5->R7 |
| IP-4/xx | R5->R8 |
| IP-5/xx | Self |
| IP-6/xx | R5->R6 |
| IP-7/xx | R4->R7 |
| IP-8/xx | R4->R8 |
| ... | ... |
| IP-65/yy | R5->R6 |
| .... | .... |
| IP-75/yy | R5->R7 |
| ..... | ..... |
| IP-85/yy | R5->R8 |
| ...... | ...... |

*FIG. 2F*

| IP ROUTE TABLE 111-6 ||
|---|---|
| IP-PREFIX | NEXT-HOP |
| IP-1/xx | R6->R1 |
| IP-2/xx | R6->R2 |
| IP-3/xx | R6->R7 |
| IP-4/xx | R6->R8 |
| IP-5/xx | R6>R5 |
| IP-6/xx | Self |
| IP-7/xx | R6->R7 |
| IP-8/xx | R6->R8 |
| ... | ... |
| IP-16/yy | R6->R1 |
| .... | .... |
| IP-26/yy | R6->R2 |
| ..... | ..... |
| IP-56/yy | R6->R5 |
| ..... | ..... |
| IP-76/yy | R6->R7 |
| ..... | ..... |
| IP-86/yy | R6->R8 |

*FIG. 2G*

| IP ROUTE TABLE 111-7 ||
| IP-PREFIX | NEXT-HOP |
|---|---|
| IP-1/xx | R6->R1 |
| IP-2/xx | R6->R2 |
| IP-3/xx | R6->R7 |
| IP-4/xx | R6->R8 |
| IP-5/xx | R6>R5 |
| IP-6/xx | Self |
| IP-7/xx | R6->R7 |
| IP-8/xx | R6->R8 |
| ... | ... |
| IP-16/yy | R6->R1 |
| .... | .... |
| IP-26/yy | R6->R2 |
| .... | ..... |
| IP-56/yy | R6->R5 |
| ..... | ..... |
| IP-76/yy | R6->R7 |
| ..... | ..... |
| IP-86/yy | R6->R8 |

*FIG. 2H*

| IP ROUTE TABLE 111-8 ||
| IP-PREFIX | NEXT-HOP |
|---|---|
| IP-1/xx | R8->R6 |
| IP-2/xx | R8->R6 |
| IP-3/xx | R8->R3 |
| IP-4/xx | R8->R4 |
| IP-5/xx | R8->R5 |
| IP-6/xx | R8->R6 |
| IP-7/xx | R8->R7 |
| IP-8/xx | Self |
| ... | ... |
| IP-38/yy | R8->R3 |
| .... | .... |
| IP-48/yy | R8->R4 |
| .... | ..... |
| IP-58/yy | R8->R5 |
| ..... | ..... |
| IP-68/yy | R8->R6 |
| ..... | ..... |
| IP-78/yy | R8->R7 |

FIG. 4

TAG ADDRESS 400

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
~                         Tree Address                          ~
+-+-+-+-+-+-+-+-+-+-+-+-+-+-+-+-+-+-+-+-+-+-+-+-+-+-+-+-+-+-+-+-+
~                        Gateway Address                        ~
+-+-+-+-+-+-+-+-+-+-+-+-+-+-+-+-+-+-+-+-+-+-+-+-+-+-+-+-+-+-+-+-+
```

FIG. 5

IPv4 HEADER 500

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Version|  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum       |
+-+-+-+-+-+-+-+-+-+-+-+-+-+-+-+-+-+-+-+-+-+-+-+-+-+-+-+-+-+-+-+-+
|                         Source Address                        |
+-+-+-+-+-+-+-+-+-+-+-+-+-+-+-+-+-+-+-+-+-+-+-+-+-+-+-+-+-+-+-+-+
|                       Destination Address                     |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+

COPY CLASS NUMBER LENGTH DESCRIPTION
----  ----- ------ ------ -----------
 1     0      18    var.  Traffic Engineered Explicit Multicast Route
                          (EMR-TE). Used for stateless multicast
                          of the Internet datagram based on EMR-TE
                          information supplied by the source.
```

EMR-TE OPTION 600

*FIG. 11*

IPV6-EMR-TE
EXTENSION HEADER
1100

```
 0 1 2 3 4 5 6 7
+-+-+-+-+-+-+-+-+
|O|     U       |
+-+-+-+-+-+-+-+-+
```

```
+-+-+-+-+-+-+-+-+-+-+-+-+-+-+-+-+-+-+-+-+-+-+-+-+-+-+-+-+-+-+-+-+
| Next Header   | Hdr Ext Len   | EMR Type=0    | Flags         |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                   IPV6-Address-List[1]                        +
|                                                               |
+                                                               +
|                                                               |
+-+-+-+-+-+-+-+-+-+-+-+-+-+-+-+-+-+-+-+-+-+-+-+-+-+-+-+-+-+-+-+-+
                             .
                             .
                             .
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                   IPV6-Address-List[n]                        +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

FIG. 12

IPV6-EMR-TE SHIM
HEADER
1200

```
 0 1 2 3 4 5 6 7
+-+-+-+-+-+-+-+-+
|O|     U       |
+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Flags         |                  RESERVED                    |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                    IPV6-Address-List[1]                       +
|                                                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+

.
                              .
                              .

+-+-+-+-+-+-+-+-+-+-+-+-+-+-+-+-+-+-+-+-+-+-+-+-+-+-+-+-+-+-+-+-+
|                                                               |
+                                                               +
|                                                               |
+                    IPV6-Address-List[n]                       +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 13*

```
IPV4 Header: Source Address (SA) = IP-1, Destination Address (DA) = IP-51
   Option: EMR-TE 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(145)   |   Length(36)  |     Flags     |    RESERVED   |
+-+-+-+-+-+-+-+-+-+-+-+-+-+-+-+-+-+-+-+-+-+-+-+-+-+-+-+-+-+-+-+-+
|                             IP-25                             |
+-+-+-+-+-+-+-+-+-+-+-+-+-+-+-+-+-+-+-+-+-+-+-+-+-+-+-+-+-+-+-+-+
|                             IP-75                             |
+-+-+-+-+-+-+-+-+-+-+-+-+-+-+-+-+-+-+-+-+-+-+-+-+-+-+-+-+-+-+-+-+
|                             IP-37                             |
+-+-+-+-+-+-+-+-+-+-+-+-+-+-+-+-+-+-+-+-+-+-+-+-+-+-+-+-+-+-+-+-+
|                             IP-47                             |
+-+-+-+-+-+-+-+-+-+-+-+-+-+-+-+-+-+-+-+-+-+-+-+-+-+-+-+-+-+-+-+-+
|                             IP-2                              |
+-+-+-+-+-+-+-+-+-+-+-+-+-+-+-+-+-+-+-+-+-+-+-+-+-+-+-+-+-+-+-+-+
|                             IP-3                              |
+-+-+-+-+-+-+-+-+-+-+-+-+-+-+-+-+-+-+-+-+-+-+-+-+-+-+-+-+-+-+-+-+
|                             IP-4                              |
+-+-+-+-+-+-+-+-+-+-+-+-+-+-+-+-+-+-+-+-+-+-+-+-+-+-+-+-+-+-+-+-+
|                             IP-7                              |
+-+-+-+-+-+-+-+-+-+-+-+-+-+-+-+-+-+-+-+-+-+-+-+-+-+-+-+-+-+-+-+-+
```

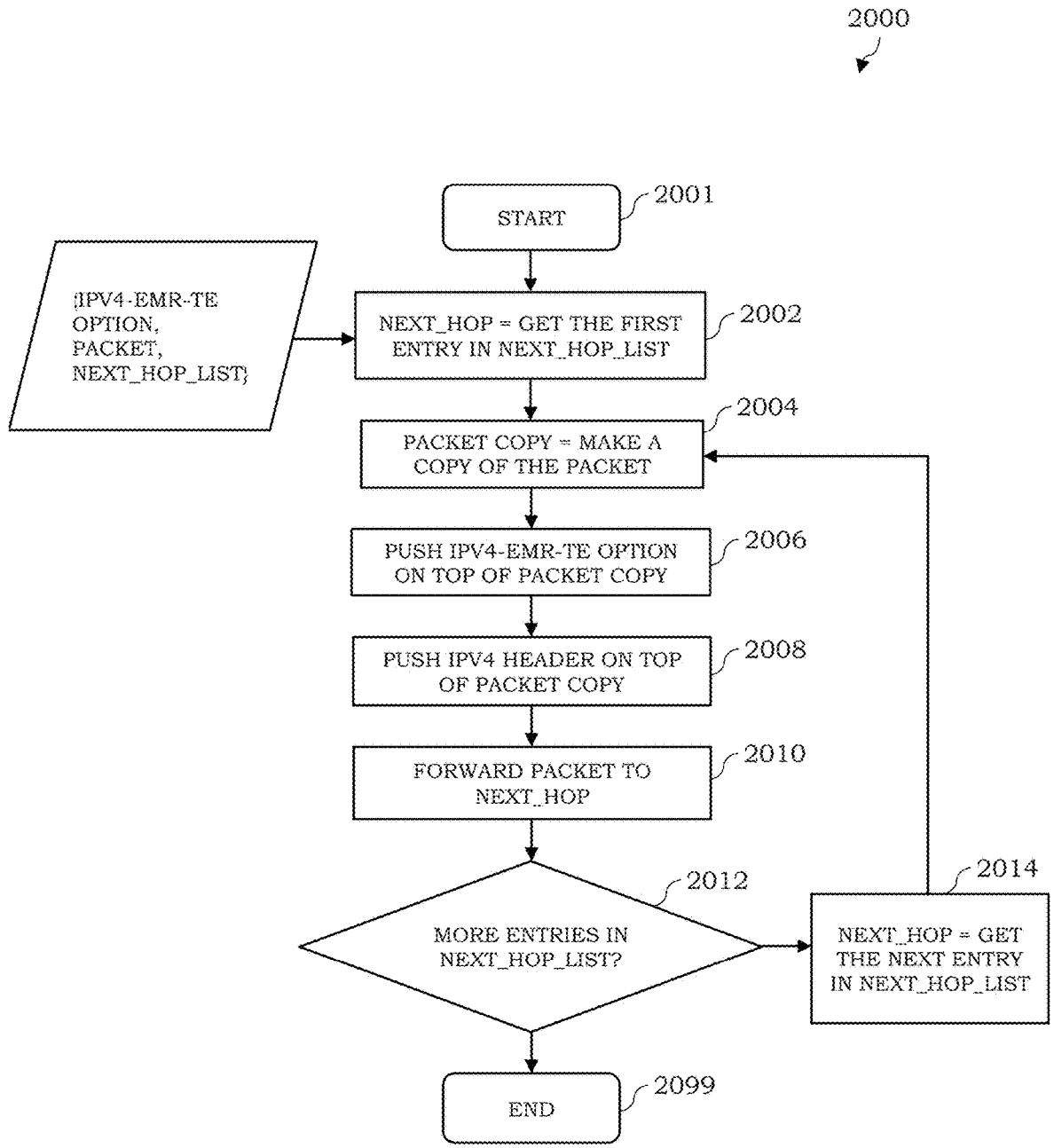

STATELESS MULTICAST WITH TRAFFIC ENGINEERING

TECHNICAL FIELD

Various example embodiments relate generally to communication systems and, more particularly but not exclusively, to supporting stateless multicast in communication systems.

BACKGROUND

In many communication networks, various communications technologies may be used to support various communications which may be supported using various protocols.

SUMMARY

In at least some example embodiments, an apparatus includes at least one processor and at least one memory including a set of instructions, wherein the set of instructions is configured to, when executed by the at least one processor, cause the apparatus to support communication of a multicast packet using an explicit path multicast tree in a network, wherein the multicast packet includes a payload and a header, wherein the payload includes a packet of a multicast flow, wherein the header includes an encoding of the explicit path multicast tree based on a set of identifiers, wherein the set of identifiers includes a set of node identifiers indicative of a set of egress nodes of the explicit path multicast tree and a set of adjacency identifiers indicative of a set of adjacencies for a set of explicit hops of the explicit path multicast tree. In at least some example embodiments, the set of identifiers includes a set of Internet Protocol (IP) addresses. In at least some example embodiments, the node identifiers include respective addresses of the respective egress nodes of the explicit path multicast tree. In at least some example embodiments, the respective addresses of the respective egress nodes of the explicit path multicast tree include Internet Protocol (IP) addresses. In at least some example embodiments, the adjacencies include forward connected adjacencies. In at least some example embodiments, the adjacency identifiers include respective addresses of the respective adjacencies for the respective explicit hops of the explicit path multicast tree. In at least some example embodiments, the respective addresses of the respective adjacencies for the respective explicit hops of the explicit path multicast tree include Internet Protocol (IP) addresses. In at least some example embodiments, the explicit path multicast tree is configured to support a set of quality-of-service (QoS) requirements of the multicast flow. In at least some example embodiments, the explicit path multicast tree includes an Internet Protocol Traffic Engineering (IP-TE) tree. In at least some example embodiments, to support communication of the multicast packet, the set of instructions is configured to, when executed by the at least one processor, cause the apparatus to receive, by an ingress node of the explicit path multicast tree, the packet of the multicast flow, generate, by the ingress node based on the packet of the multicast flow, the multicast packet, and send, by the ingress node toward a next-hop node, the multicast packet. In at least some example embodiments, to generate the multicast packet, the set of instructions is configured to, when executed by the at least one processor, cause the apparatus to determine the explicit path multicast tree, generate the encoding of the explicit path multicast tree, and associate the encoding of the explicit path multicast tree with the packet of the multicast flow to form the multicast packet. In at least some example embodiments, to support communication of the multicast packet, the set of instructions is configured to, when executed by the at least one processor, cause the apparatus to receive, by a router, the multicast packet and process, by the router based on a determination that one of the node identifiers in the set of node identifiers identifies the router, the multicast packet to provide the packet of the multicast flow for processing at the router. In at least some example embodiments, to process the multicast packet to provide the packet of the multicast flow for processing at the router, the set of instructions is configured to, when executed by the at least one processor, cause the apparatus to make a copy of the multicast packet, remove the header from the copy of the multicast packet to recover the packet of the multicast flow, and provide the packet of the multicast flow to a local context of the router. In at least some example embodiments, to support communication of the multicast packet, the set of instructions is configured to, when executed by the at least one processor, cause the apparatus to receive, by a router, the multicast packet, process, by the router based on a determination that one of the adjacency identifiers in the set of adjacency identifiers identifies a forward connected adjacency at the router, the multicast packet to form a second multicast packet for the forward connected adjacency, and forward, by the router toward the forward connected adjacency, the second multicast packet. In at least some example embodiments, to process the multicast packet to form the second multicast packet for the forward connected adjacency, the set of instructions is configured to, when executed by the at least one processor, cause the apparatus to make a copy of the multicast packet and remove, from the copy of the multicast packet, the one of the adjacency identifiers in the set of adjacency identifiers that identifies the forward connected adjacency at the router. In at least some example embodiments, the set of identifiers further includes a gateway identifier of a gateway node of a sub-domain of the network and a tree identifier indicative of a tree from the gateway router to one or more egress nodes of the explicit path multicast tree. In at least some example embodiments, the gateway identifier and the tree identifier form a tuple within the header of the multicast packet. In at least some example embodiments, to support communication of the multicast packet, the set of instructions is configured to, when executed by the at least one processor, cause the apparatus to receive, by a router, the multicast packet, process, by the router based on a determination that the router is the gateway router, the multicast packet to form a second multicast packet, and forward, by the router in the sub-domain, the second multicast packet. In at least some example embodiments, to process the multicast packet, the set of instructions is configured to, when executed by the at least one processor, cause the apparatus to determine, by the router based on the tree identifier, one or more node identifiers indicative of the respective one or more egress nodes of the explicit path multicast tree and include, by the router within the second packet, the one or more node identifiers indicative of the respective one or more egress nodes of the explicit path multicast tree. In at least some example embodiments, the packet of the multicast flow includes a packet of a multicast flow overlay. In at least some example embodiments, the multicast flow overlay includes at least one of an Internet Protocol (IP) overlay, an IP—Virtual Private Network (IP-VPN) overlay, a Multiprotocol Label Switching (MPLS) overlay, a Border Gateway Protocol—

Ethernet Virtual Private Network (BGP-EVPN) overlay, or a Virtual Private Local Area Network (LAN) Service (VPLS) overlay.

In at least some example embodiments, a non-transitory computer-readable medium stores a set of instructions configured to cause an apparatus to support communication of a multicast packet using an explicit path multicast tree in a network, wherein the multicast packet includes a payload and a header, wherein the payload includes a packet of a multicast flow, wherein the header includes an encoding of the explicit path multicast tree based on a set of identifiers, wherein the set of identifiers includes a set of node identifiers indicative of a set of egress nodes of the explicit path multicast tree and a set of adjacency identifiers indicative of a set of adjacencies for a set of explicit hops of the explicit path multicast tree. In at least some example embodiments, the set of identifiers includes a set of Internet Protocol (IP) addresses. In at least some example embodiments, the node identifiers include respective addresses of the respective egress nodes of the explicit path multicast tree. In at least some example embodiments, the respective addresses of the respective egress nodes of the explicit path multicast tree include Internet Protocol (IP) addresses. In at least some example embodiments, the adjacencies include forward connected adjacencies. In at least some example embodiments, the adjacency identifiers include respective addresses of the respective adjacencies for the respective explicit hops of the explicit path multicast tree. In at least some example embodiments, the respective addresses of the respective adjacencies for the respective explicit hops of the explicit path multicast tree include Internet Protocol (IP) addresses. In at least some example embodiments, the explicit path multicast tree is configured to support a set of quality-of-service (QoS) requirements of the multicast flow. In at least some example embodiments, the explicit path multicast tree includes an Internet Protocol Traffic Engineering (IP-TE) tree. In at least some example embodiments, to support communication of the multicast packet, the set of instructions is configured to cause the apparatus to receive, by an ingress node of the explicit path multicast tree, the packet of the multicast flow, generate, by the ingress node based on the packet of the multicast flow, the multicast packet, and send, by the ingress node toward a next-hop node, the multicast packet. In at least some example embodiments, to generate the multicast packet, the set of instructions is configured to cause the apparatus to determine the explicit path multicast tree, generate the encoding of the explicit path multicast tree, and associate the encoding of the explicit path multicast tree with the packet of the multicast flow to form the multicast packet. In at least some example embodiments, to support communication of the multicast packet, the set of instructions is configured to cause the apparatus to receive, by a router, the multicast packet and process, by the router based on a determination that one of the node identifiers in the set of node identifiers identifies the router, the multicast packet to provide the packet of the multicast flow for processing at the router. In at least some example embodiments, to process the multicast packet to provide the packet of the multicast flow for processing at the router, the set of instructions is configured to cause the apparatus to make a copy of the multicast packet, remove the header from the copy of the multicast packet to recover the packet of the multicast flow, and provide the packet of the multicast flow to a local context of the router. In at least some example embodiments, to support communication of the multicast packet, the set of instructions is configured to cause the apparatus to receive, by a router, the multicast packet, process, by the router based on a determination that one of the adjacency identifiers in the set of adjacency identifiers identifies a forward connected adjacency at the router, the multicast packet to form a second multicast packet for the forward connected adjacency, and forward, by the router toward the forward connected adjacency, the second multicast packet. In at least some example embodiments, to process the multicast packet to form the second multicast packet for the forward connected adjacency, the set of instructions is configured to cause the apparatus to make a copy of the multicast packet and remove, from the copy of the multicast packet, the one of the adjacency identifiers in the set of adjacency identifiers that identifies the forward connected adjacency at the router. In at least some example embodiments, the set of identifiers further includes a gateway identifier of a gateway node of a sub-domain of the network and a tree identifier indicative of a tree from the gateway router to one or more egress nodes of the explicit path multicast tree. In at least some example embodiments, the gateway identifier and the tree identifier form a tuple within the header of the multicast packet. In at least some example embodiments, to support communication of the multicast packet, the set of instructions is configured to cause the apparatus to receive, by a router, the multicast packet, process, by the router based on a determination that the router is the gateway router, the multicast packet to form a second multicast packet, and forward, by the router in the sub-domain, the second multicast packet. In at least some example embodiments, to process the multicast packet, the set of instructions is configured to cause the apparatus to determine, by the router based on the tree identifier, one or more node identifiers indicative of the respective one or more egress nodes of the explicit path multicast tree and include, by the router within the second packet, the one or more node identifiers indicative of the respective one or more egress nodes of the explicit path multicast tree. In at least some example embodiments, the packet of the multicast flow includes a packet of a multicast flow overlay. In at least some example embodiments, the multicast flow overlay includes at least one of an Internet Protocol (IP) overlay, an IP—Virtual Private Network (IP-VPN) overlay, a Multiprotocol Label Switching (MPLS) overlay, a Border Gateway Protocol—Ethernet Virtual Private Network (BGP-EVPN) overlay, or a Virtual Private Local Area Network (LAN) Service (VPLS) overlay.

In at least some example embodiments, a method includes supporting communication of a multicast packet using an explicit path multicast tree in a network, wherein the multicast packet includes a payload and a header, wherein the payload includes a packet of a multicast flow, wherein the header includes an encoding of the explicit path multicast tree based on a set of identifiers, wherein the set of identifiers includes a set of node identifiers indicative of a set of egress nodes of the explicit path multicast tree and a set of adjacency identifiers indicative of a set of adjacencies for a set of explicit hops of the explicit path multicast tree. In at least some example embodiments, the set of identifiers includes a set of Internet Protocol (IP) addresses. In at least some example embodiments, the node identifiers include respective addresses of the respective egress nodes of the explicit path multicast tree. In at least some example embodiments, the respective addresses of the respective egress nodes of the explicit path multicast tree include Internet Protocol (IP) addresses. In at least some example embodiments, the adjacencies include forward connected adjacencies. In at least some example embodiments, the adjacency identifiers include respective addresses of the respective adjacencies for the respective explicit hops of the explicit path multicast tree. In at least some example embodiments, the respective addresses of the respective adjacencies for the respective explicit hops of the explicit path multicast tree include Internet Protocol (IP) addresses. In at least some example embodiments, the explicit path multicast tree is configured to support a set of quality-of-service (QoS) requirements of the multicast flow. In at least some example embodiments, the explicit path multicast tree includes an Internet Protocol Traffic Engineering (IP-TE) tree. In at least some example embodiments, supporting communication of the multicast packet includes receiving, by an ingress node of the explicit path multicast tree, the packet of the multicast flow, generating, by the ingress node based on the packet of the multicast flow, the multicast packet, and sending, by the ingress node toward a next-hop node, the multicast packet. In at least some example embodiments, generating the multicast packet includes determining the explicit path multicast tree, generating the encoding of the explicit path multicast tree, and associating the encoding of the explicit path multicast tree with the packet of the multicast flow to form the multicast packet. In at least some example embodiments, supporting communication of the multicast packet includes receiving, by a router, the multicast packet and processing, by the router based on a determination that one of the node identifiers in the set of node identifiers identifies the router, the multicast packet to provide the packet of the multicast flow for processing at the router. In at least some example embodiments, processing the multicast packet to provide the packet of the multicast flow for processing at the router includes making a copy of the multicast packet, removing the header from the copy of the multicast packet to recover the packet of the multicast flow, and providing the packet of the multicast flow to a local context of the router. In at least some example embodiments, supporting communication of the multicast packet includes receiving, by a router, the multicast packet, processing, by the router based on a determination that one of the adjacency identifiers in the set of adjacency identifiers identifies a forward connected adjacency at the router, the multicast packet to form a second multicast packet for the forward connected adjacency, and forwarding, by the router toward the forward connected adjacency, the second multicast packet. In at least some example embodiments, processing the multicast packet to form the second multicast packet for the forward connected adjacency includes making a copy of the multicast packet and removing, from the copy of the multicast packet, the one of the adjacency identifiers in the set of adjacency identifiers that identifies the forward connected adjacency at the router. In at least some example embodiments, the set of identifiers further includes a gateway identifier of a gateway node of a sub-domain of the network and a tree identifier indicative of a tree from the gateway router to one or more egress nodes of the explicit path multicast tree. In at least some example embodiments, the gateway identifier and the tree identifier form a tuple within the header of the multicast packet. In at least some example embodiments, supporting communication of the multicast packet includes receiving, by a router, the multicast packet, processing, by the router based on a determination that the router is the gateway router, the multicast packet to form a second multicast packet, and forwarding, by the router in the sub-domain, the second multicast packet. In at least some example embodiments, processing the multicast packet includes determining, by the router based on the tree identifier, one or more node identifiers indicative of the respective one or more egress nodes of the explicit path multicast tree and including, by the router within the second packet, the one or more node identifiers indicative of the respective one or more egress nodes of the explicit path multicast tree. In at least some example embodiments, the packet of the multicast flow includes a packet of a multicast flow overlay. In at least some example embodiments, the multicast flow overlay includes at least one of an Internet Protocol (IP) overlay, an IP—Virtual Private Network (IP-VPN) overlay, a Multiprotocol Label Switching (MPLS) overlay, a Border Gateway Protocol—Ethernet Virtual Private Network (BGP-EVPN) overlay, or a Virtual Private Local Area Network (LAN) Service (VPLS) overlay.

In at least some example embodiments, an apparatus includes means for supporting communication of a multicast packet using an explicit path multicast tree in a network, wherein the multicast packet includes a payload and a header, wherein the payload includes a packet of a multicast flow, wherein the header includes an encoding of the explicit path multicast tree based on a set of identifiers, wherein the set of identifiers includes a set of node identifiers indicative of a set of egress nodes of the explicit path multicast tree and a set of adjacency identifiers indicative of a set of adjacencies for a set of explicit hops of the explicit path multicast tree. In at least some example embodiments, the set of identifiers includes a set of Internet Protocol (IP) addresses. In at least some example embodiments, the node identifiers include respective addresses of the respective egress nodes of the explicit path multicast tree. In at least some example embodiments, the respective addresses of the respective egress nodes of the explicit path multicast tree include Internet Protocol (IP) addresses. In at least some example embodiments, the adjacencies include forward connected adjacencies. In at least some example embodiments, the adjacency identifiers include respective addresses of the respective adjacencies for the respective explicit hops of the explicit path multicast tree. In at least some example embodiments, the respective addresses of the respective adjacencies for the respective explicit hops of the explicit path multicast tree include Internet Protocol (IP) addresses. In at least some example embodiments, the explicit path multicast tree is configured to support a set of quality-of-service (QoS) requirements of the multicast flow. In at least some example embodiments, the explicit path multicast tree includes an Internet Protocol Traffic Engineering (IP-TE) tree. In at least some example embodiments, the means for supporting communication of the multicast packet includes means for receiving, by an ingress node of the explicit path multicast tree, the packet of the multicast flow, means for generating, by the ingress node based on the packet of the multicast flow, the multicast packet, and means for sending, by the ingress node toward a next-hop node, the multicast packet. In at least some example embodiments, the means for generating the multicast packet includes means for determining the explicit path multicast tree, means for generating the encoding of the explicit path multicast tree, and means for associating the encoding of the explicit path multicast tree with the packet of the multicast flow to form the multicast packet. In at least some example embodiments, the means for supporting communication of the multicast packet includes means for receiving, by a router, the multicast packet and means for processing, by the router based on a determination that one of the node identifiers in the set of node identifiers identifies the router, the multicast packet to provide the packet of the multicast flow for processing at the router. In at least some example embodiments, the means for processing the multicast packet to provide the packet of the multicast flow for processing at the router includes means for making a copy of the multicast packet, means for removing the header from the copy of the multicast packet to recover the packet of the multicast flow, and means for providing the packet of the multicast flow to a local context of the router. In at least some example embodiments, the means for supporting communication of the multicast packet includes means for receiving, by a router, the multicast packet, means for processing, by the router based on a determination that one of the adjacency identifiers in the set of adjacency identifiers identifies a forward connected adjacency at the router, the multicast packet to form a second multicast packet for the forward connected adjacency, and means for forwarding, by the router toward the forward connected adjacency, the second multicast packet. In at least some example embodiments, the means for processing the multicast packet to form the second multicast packet for the forward connected adjacency includes means for making a copy of the multicast packet and means for removing, from the copy of the multicast packet, the one of the adjacency identifiers in the set of adjacency identifiers that identifies the forward connected adjacency at the router. In at least some example embodiments, the set of identifiers further includes a gateway identifier of a gateway node of a sub-domain of the network and a tree identifier indicative of a tree from the gateway router to one or more egress nodes of the explicit path multicast tree. In at least some example embodiments, the gateway identifier and the tree identifier form a tuple within the header of the multicast packet. In at least some example embodiments, the means for supporting communication of the multicast packet includes means for receiving, by a router, the multicast packet, means for processing, by the router based on a determination that the router is the gateway router, the multicast packet to form a second multicast packet, and means for forwarding, by the router in the sub-domain, the second multicast packet. In at least some example embodiments, the means for processing the multicast packet includes means for determining, by the router based on the tree identifier, one or more node identifiers indicative of the respective one or more egress nodes of the explicit path multicast tree and means for including, by the router within the second packet, the one or more node identifiers indicative of the respective one or more egress nodes of the explicit path multicast tree. In at least some example embodiments, the packet of the multicast flow includes a packet of a multicast flow overlay. In at least some example embodiments, the multicast flow overlay includes at least one of an Internet Protocol (IP) overlay, an IP—Virtual Private Network (IP-VPN) overlay, a Multiprotocol Label Switching (MPLS) overlay, a Border Gateway Protocol—Ethernet Virtual Private Network (BGP-EVPN) overlay, or a Virtual Private Local Area Network (LAN) Service (VPLS) overlay.

BRIEF DESCRIPTION OF THE DRAWINGS

The teachings herein can be readily understood by considering the following detailed description in conjunction with the accompanying drawings, in which:

FIGS. 2A-2H depict example embodiments of IP Route Tables for routers of a multicast domain of the communication system of FIG. 1;

FIG. 4 depicts an example embodiment of a tree-and-gateway (TAG) format including a tree address and a gateway address;

FIG. 5 depicts an example embodiment of an IPv4 Header including a definition of a new IPv4 Option defined for EMR-TE;

FIG. 11 depicts an example embodiment of a format of an IPV6-EMR-TE Extension Header for use in an IPv6 Header;

FIG. 12 depicts an example embodiment of a format of an IPV6-EMR-TE Shim Header;

FIG. 13 depicts an example embodiment of an encoding of an EMR-TE packet where the EMR-TE being is pushed on the packet as IPV4-EMR-TE Option;

FIG. 20 depicts an example embodiment of a method for forwarding of an EMR-TE packet;

To facilitate understanding, identical reference numerals have been used herein, wherever possible, in order to designate identical elements that are common among the various figures.

DETAILED DESCRIPTION

Various example embodiments for supporting stateless multicast in communication networks are presented. Various example embodiments for supporting stateless multicast in communication networks may be configured to support stateless multicast in a packet distribution network that supports traffic engineering (TE). Various example embodiments for supporting stateless multicast in a packet distribution network that supports TE may be configured to support stateless multicast in a stateless multicast domain with TE. Various example embodiments for supporting stateless multicast in a stateless multicast domain with TE may be configured to support stateless multicast in a stateless IP multicast domain with TE, which may be referred to herein as a stateless IP multicast TE domain. Various example embodiments for supporting stateless multicast in a stateless IP multicast TE domain may be configured to support communication of a multicast packet using an explicit path multicast tree in a network, wherein the multicast packet includes a payload and a header, wherein the payload includes a packet of a multicast flow, wherein the header includes an encoding of the explicit path multicast tree based on a set of identifiers, wherein the set of identifiers includes a set of node identifiers indicative of a set of egress nodes of the explicit path multicast tree and a set of adjacency identifiers indicative of a set of adjacencies for a set of explicit hops of the explicit path multicast tree. Various example embodiments for supporting stateless multicast in a stateless IP multicast TE domain may be configured to support communication of a multicast packet of a multicast flow overlay (e.g., an IP overlay, an IP—Virtual Private Network (IP-VPN) overlay, a Multiprotocol Label Switching (MPLS) overlay, a Border Gateway Protocol—Ethernet Virtual Private Network (BGP-EVPN) overlay, a Virtual Private Local Area Network (LAN) Service (VPLS) overlay, or the like, as well as various combinations thereof). It will be appreciated that these and various other example embodiments and advantages or potential advantages of supporting stateless multicast in a packet distribution network with traffic engineering may be further understood by way of reference to the various figures, which are discussed further below.

Figure 1:
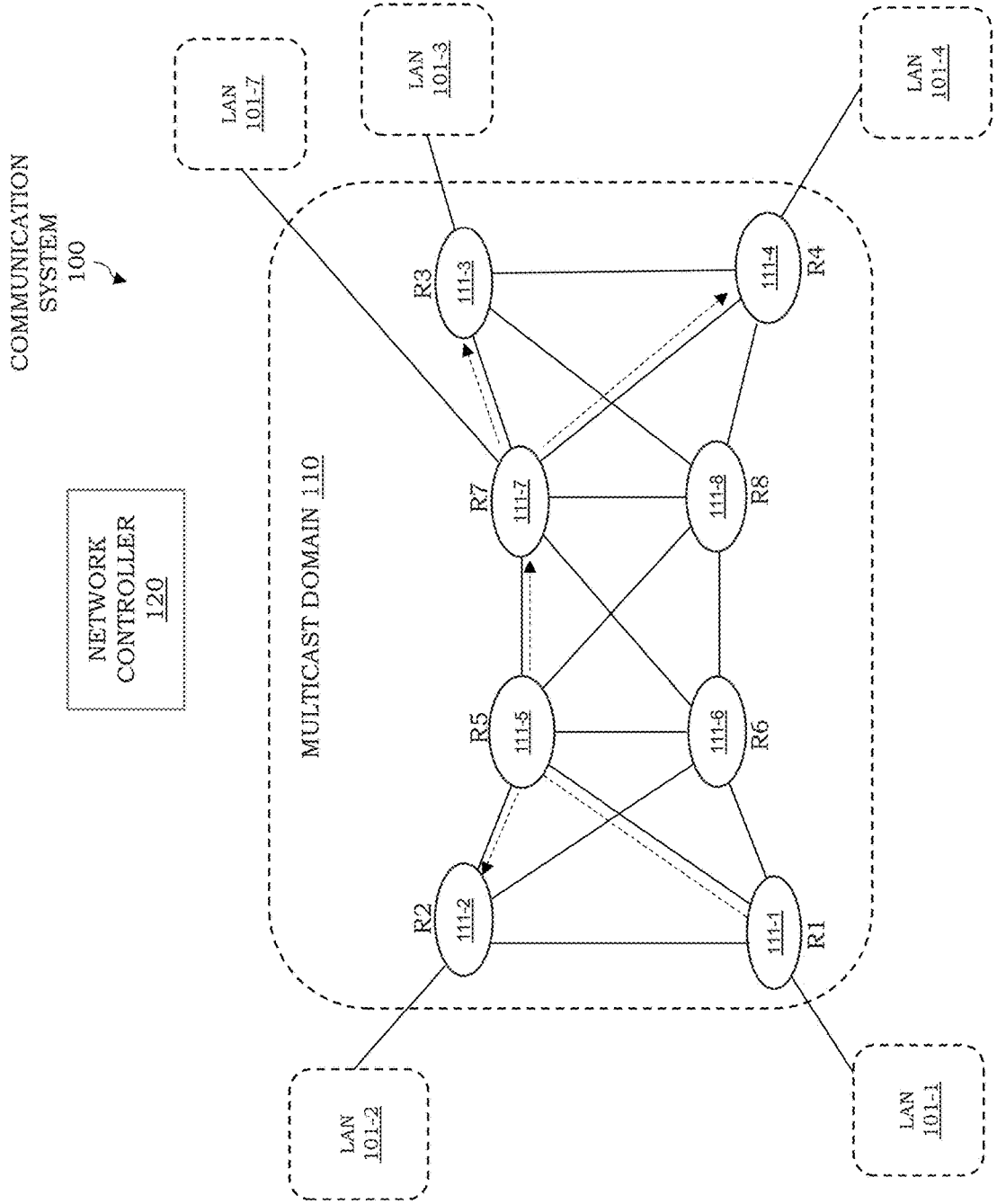
FIG. 1 depicts an example embodiment of a communication system configured to support stateless multicast in a packet distribution network.

FIG. 1 depicts an example embodiment of a communication system configured to support stateless multicast in a packet distribution network with traffic engineering.

The communication system 100 includes a set of local area networks (LANs) 101-1-101-4 and 101-7 (collectively, LANs 101) interconnected via a multicast domain 110 which is controlled by a network controller 120. It will be appreciated that although, for simplicity, the LANs 101 are used as the originators and recipients of packets being multicast via the multicast domain 110, the multicast domain 110 may be configured to support multicast of packets for various other applications (e.g., Virtual Private Networks (VPNs), Virtual Private LAN Services (VPLSs), Border Gateway Protocol—Ethernet Virtual Private Network (BGP-EVPN) services, or the like, as well as various combinations thereof). The multicast domain 110 includes a set of routers 111-1-111-8 (collectively, routers 111) which, for ease of reference, also are referred to herein as R1-R8 (e.g., R1 is router 111-1, R2 is router 111-2, and so forth, or, more generally, Rx is router 111-x), respectively. The routers 111-1 to 111-4 are configured as access points to the multicast domain 110 for the LANs 101-1 to 101-4, respectively.

The multicast domain 110 is configured to support multicast communications. In general, multicast is a capability for sending packets to a group of interested receivers in a single transmission. In general, multicast uses network infrastructure efficiently by having the source send a packet only once, even if it needs to be delivered to a large number of receivers. The nodes in the network take care of replicating the packet to the multiple receivers, as necessary. In multicast, a single packet may be sent by a source S to a group address G which is received by all nodes that are members of G. Here, a flow can be described as (S, G), i.e. from a source S to the group G constitutes a flow. For example, assume that the multicast domain 110 supports three multicast flows from router 111-1 (as the source S) as follows: (1) Flow 1: (S=111-1, G=G1) to egress routers 111-3, 111-4, (2) Flow 2: (S=111-1, G=G2) to egress routers 111-2, 111-3, and (3) Flow 3: (S=111-1, G=G3) to egress router: 111-2, 111-3, and 111-4. It will be appreciated that the multicast domain 110 may support various types of multicast (e.g., IP multicast, MPLS multicast, or the like). It will be appreciated that IP and/or MPLS multicast may be employed in various applications of streaming media, such as IP Television (IPTV), multipoint video conferencing, and the like. It will be appreciated that the multicast domain 110 may support stateful multicast, stateless multicast, or the like.

The network controller 120 is configured to provide control functions to support multicast within the multicast domain 110. The network controller 120 may be configured to maintain topology information of the network domain 110. The network controller 120 may be configured to support configuration of the multicast domain 110 to support multicast communications. For example, the network controller 120 may be configured to receive path requests from routers 111, compute paths through the network domain 110, and provide configuration information to the routers 111 for configuring the routers 111 to support the computed paths. The network controller 120 may be implemented in various ways in order to provide control functions to support multicast within the multicast domain 110. For example, the network controller 120 may be a network management system (NMS), an element management system (EMS), a software defined networking (SDN) controller, a path computation element (PCE), or the like, as well as various combinations thereof. It will be appreciated that the network controller 120 may be configured to provide various other control functions to support multicast within the multicast domain 110.

It is noted that various aspects of various example embodiments for supporting stateless multicast in a stateless IP multicast TE domain may be further understood by first considering aspects of stateful IP multicast.

As indicated above, multicast communication may be supported based on use of IP multicast. IP multicast is the IP-specific version of the general concept of multicast networking. It uses reserved multicast address blocks in IPv4 and IPv6 as the destination address (e.g., group address G) in the IP header. In Point-to-Multipoint (P2MP) IP multicast, a single IP packet is sent by a source S to the group address G which is received by all nodes that are members of G. Here, a flow can be described as (S, G), i.e. from a source S to the group G constitutes a flow. In Multipoint-to-Multipoint (MP2MP) IP multicast, a single IP packet is sent by any source to the group address G, which is received by all nodes that are members of G. Here, a multicast flow can be described as (*, G), i.e., from any source to the group G constitutes a flow.

As indicated above, where the multicast domain 110 supports stateful IP multicast, the multicast flows may be set up across the multicast domain 110 by an IP multicast control plane. A Multicast Distribution Tree (MDT) for a specific IP multicast flow may be set up by control protocols, such as Protocol Independent Multicast (PIM), PIM—Sparse Mode (PIM-SM), PIM—Dense Mode (PIM-DM), Internet Group Membership Protocol (IGMP), or the like. The control protocols set up the MDT by configuring the multicast flow in each router along the MDT. This form of IP multicast is stateful since every router along the MDT is required to maintain states for the MDT in the control plane and the data plane. The egress routers may rely on IGMP to learn interests of locally connected hosts/receivers in LANs for a specific G from a source S, and the egress routers may then initiate "(S, G) join" requests towards S by using PIM. The PIM join traverses the nodes along the shortest path to S, while installing (S, G) state in control and data plane of the traversed nodes. A router that has received (S, G) join from a second router, installs the second router as a downstream/branch in the (S, G) state. This results in an MDT for the (S, G), where the root is S and every leaf node is an egress router interested in G. A packet sent by S on the (S, G) will be forwarded along the MDT based on (S, G) state at each forwarding router. This may be further understood by considering establishment of Flow 1. For example, egress routers 111-3 and 111-4 received interest on (S=111-1, G=G1) through IGMP request from host(s) in their LANs 101-3 and 101-4, respectively, thereby triggering egress routers 111-3 and 111-4 to initiate PIM joins for (S=111-1, G=G1) toward the router 111-7, since the router 111-7 is the immediate next-hop in the shortest path toward the source router 111-1. The router 111-7 installs state for (S=111-1, G=G1) in both the control plane and data plane with egress routers 111-3 and 111-4 as the downstream routers. The router 111-7 further sends the PIM join to router 111-5 and the router 111-5 installs state with the router 111-7 indicated as the downstream router. The router 111-5 further sends the PIM join to the source router 111-1 and the source router 111-1 creates the state for (S=111-1, G=G1) with the router 111-5 as the downstream router. This makes the MDT for (S=111-1, G=G1) complete. When the source router 111-1 transmits an IP packet with source address 111-1 and group address G1, it gets forwarded and replicated by transit routers 111 along the established path of the MDT, to get delivered to the egress router 111-3 and 111-4. It will be appreciated that the actual source of the multicast flow could be an entity in the LAN 101-1, in which case, when the router 111-1 receives a packet on the flow, the router 111-1 would encapsulate the packet with an IP header with the source address as router 111-1 and the destination address as G1 and then transmit the packet on the MDT.

As indicated above, when the multicast domain 110 supports stateful IP multicast, various applications may be supported. For simplicity, the LANs 101 are used in the examples as the originators and recipients of packets on an MDT; however, it will be appreciated that an MDT could be used by any other application (e.g., VPN, VPLS, BGP-EVPN, or the like) for multicast in those applications. It will be appreciated that applications that use an MDT for multicasting packets may be referred to more generally herein as multicast flow overlays. For example, in FIG. 1, the routers 111-1, 111-3, and 111-4 could be the provider edge (PE) routers providing IP-based VPN service. The multicast flow overlay may be considered to include the protocols and procedures between the routers 111-1, 111-3 and 111-4 as described in Multicast VPN (MVPN) and BGP-MVPN standards. The MVPN signaling described in such standards enables an ingress PE to determine the set of egress PEs for a given multicast flow (or set of flows) and also enables egress PE routers to determine the VRF to which a multicast packet received from the MDT is to be forwarded. In VPN, a PE router has a locally connected VPN site. The ingress PE router receives a packet from its local VPN site, looks up the packet in the "Virtual Routing and Forwarding Table" (VRF) of the VPN to identify the egress PE router for the packet, and, if the packet needs to be multicast to a set of egress PE routers, sends the packet on the MDT that has the egress routers as leaves. The egress PE routers determine the VRF to which a multicast packet received from the MDT is to be forwarded. It will be appreciated that these as well as various other applications also may be supported using stateless multicast.

As indicated above, multicast communications in multicast domain 110 may be supported based on use of stateless IP multicast. In FIG. 1, when a packet enters the multicast domain 110, handling of the packet within the multicast domain 110 in a stateless manner may be performed as follows. The handling of the packet within the multicast domain 110 in a stateless manner may be performed based on unicast IP routes between routers 111, where the unicast IP routes between routers 111 may be based on IP addresses of the routers 111 (e.g., loopback IP addresses of the routers 111 or other suitable IP addresses of the routers 111), which may be specified using IP-X to represent the IP address of router X (e.g., IP-1 is the IP address of R1, IP-2 in the IP address of R2, and so forth). The IP addresses which are used for stateless multicast may be advertised throughout the network using the IP control plane (e.g., using protocols such as Open Shortest Path First (OSPF), OSPF version 3 (OSPFv3), Intermediate-System-to-Intermediate-System (IS-IS), Border Gateway Protocol (BGP), or the like), based on which each router 111 computes Shortest Path First (SPF) to the loopback IP address and, accordingly, sets up the forwarding state of the loopback IP address, i.e., installs it as an entry into the IP Route Table. So, a unicast IP route exists between each of the routers 111 in the multicast domain 110 and, thus, a unicast route exists from any ingress router 111 to each of the egress routers 111 of the multicast group. The ingress router 111 determines the set of egress routers 111 to which the packet is to be sent. The ingress router 111 then encapsulates the packet in a list of IP addresses, wherein each IP address in the list of IP addresses represents exactly one egress router 111 in the multicast domain 110 (e.g., the IP address may be a loopback IP address in the egress router 111 or any other suitable address of the egress router 111). Thus, the egress routers 111 for the multicast packet are encoded into the packet itself. The list of IP addresses is denoted as an "Explicit Multicast Route" (EMR) and the packet including the EMR is denoted as an EMR packet. The EMR packet including the EMR is originated by an ingress router 111 and is forwarded using the data plane states of the unicast IP routing (e.g., IP Route Tables on the routers 111) to the egress routers 111. More specifically, each router 111 along the multicast path parses the EMR packet, partitions the egress routers 111 based on the next-hop of their matching routes (e.g., from the IP Route Table), and forwards an appropriate EMR packet to each of the next-hop routers 111 until the EMR packets reach each of the egress routers 111, which then remove the EMR and forward the packet in the context of the multicast flow overlay. Thus, both multicast packets and unicast packets may be sent to the egress routers 111 using the common IP data plane states.

As indicated above, multicast communications in multicast domain 110 may be supported based on use of stateless IP multicast.

In FIG. 1, when a packet enters the multicast domain 110, handling of the packet within the multicast domain 110 in a stateless manner may be performed as follows.

In this example, assume that router 111-1 wants to multicast a packet for (S=111-1, G=G3). Router 111-1 looks up the loopback IP addresses of egress routers R2, R3, and R4 in its IP Route Table. The next-hop of the matching routes to all of the egress routers is router 111-5. So, the router 111-1 generates an EMR packet with EMR={IP-2, IP-3, IP-4} and sends the packet to router 111-5.

When router 111-5 receives the EMR packet, it needs to process the EMR in the EMR packet in order to make forwarding decisions for the EMR packet. In general, the processing that a router, such as router 111-5, performs upon receiving an EMR packet is as follows. The processing router performs an IP Route Table lookup to determine the next-hop for each of the addresses listed in the EMR. If the matching route entry for an address of the EMR indicates that this is an egress router for the EMR packet, then the address is removed from the EMR and a local copy of the packet is sent to the upper layer at the router. If the matching route entry for an address of the EMR indicates that this is not an egress router for the EMR packet, then processing continues. After all of the addresses of the EMR have been checked and any next-hops of the addresses have been identified, the addresses are partitioned based on the next-hops associated with the addresses. The EMR packet is then replicated so that there is a copy of the EMR packet for each of the groups of addresses and, thus, for each of the next-hops identified during the processing of the addresses in the EMR. The EMRs in the copies of the EMR packet are modified so that the EMRs in the copies of the EMR packet include only the addresses that are to be switched to the next-hops (i.e., the addresses of the partitions), respectively. The modified copies of the EMR packets are then sent to the next-hops with which the modified copies of the EMR packets are associated, respectively. It is noted that, if there is only a single address specified for a next-hop, rather than a set of multiple addresses, the modified copy of the EMR packet may be sent as a unicast IP packet with the single address as the destination IP address in the IP Header.

When router 111-5 receives the packet with EMR={IP-2, IP-3, IP-4}, it will, using the processing described above, replicate the packet into two copies, based on the matching routes in its IP Route Table. Copy1, with EMR={IP-2}, is sent to router 111-2. Since there is single address, the packet can be sent as a regular unicast IP packet with IP-2 as the destination IP address in the IP Header. Copy2, with EMR={IP-3, IP-4}, is sent to router 111-7. Router 111-2 receives Copy1 and router 111-7 receives Copy2, and routers 111-2 and 111-7 perform similar procedures to handle Copy1 and Copy2, respectively. The routers 111 along the path follow similar procedures until eventually the packet gets delivered to egress routers 111-2, 111-3, and 111-4.

It will be appreciated that, when the network topology changes, the unicast IP routes to the egress routers will adapt to the new topology. The forwarding paths of the EMR packet for a flow adapts automatically as well, since the path the EMR packet would take to a given egress router always follows the unicast IP route to that egress router.

As indicated above, multicast communications in multicast domain 110 may be supported based on use of stateless IP multicast TE. The multicast domain 110 may operate as a stateless IP multicast TE domain, wherein routers 111 participate in stateless IP multicast delivery by offering TE. Stateless multicast TE may reuse configuration of the routers 111 for unicast IP routing as follows.

In the multicast domain 110, each router 111 is assigned a routable IP address, which identifies the router 111 in the multicast domain 110, referred to herein as anode address. For example, each of R1-R8 are assigned loopback addresses IP-1 to IP-8 respectively, which are the node addresses.

In the multicast domain 110, each link in a router 111 is assigned an IP address. For example, Rx assigns the address IP-xy on its link to Ry and Ry assigns the address IP-yx on its link to Rx. So, the adjacency from a first router 111 to a second router 111 is identified by the address on the link at second router 111, i.e., the next-hop address. So, adjacency Rx→Ry is identified by the "adjacency address" IP-yx and adjacency Ry→Rx is identified by the "adjacency address" IP-xy.

In the multicast domain 110, each router 111 programs the following routes into its IP Route Table as part of the unicast IP routing paradigm. The router 111 programs the node address as local. The router 111 programs each IP address for each adjacency that is "forward connected" (i.e., direction is from the router 111) to the adjacent router 111 with the forwarding context as the adjacency to the neighbor (e.g., Rx programs the adjacency address IP-yx with the forwarding context on Rx→Ry).

In the multicast domain 110, each router 111 may learn the node addresses of other routers 111 from the control plane (e.g., Link State Advertisements (LSA) in one or more Interior Gateway Protocols (IGPs) such as OSPF, IS-IS, OSPFv3, or the like). Then, each router 111 computes the best path (e.g., the shortest path if the control plane is one of the IGPs) to the node addresses of the other routers 111 and installs the paths into its IP Route Table. FIGS. 2A-2H depict the resultant IP Route Tables of the routers 111 in the multicast domain 110 (illustratively, FIGS. 2A-2H depict the IP Route Tables of routers R1-R8, respectively). It will be appreciated that, as indicated above, these IP Route Tables of the routers 111 may be used for forwarding unicast IP packets and also may be reused for forwarding packets of QoS-aware multicast flows (e.g., IP multicast TE flows) as described herein.

When a QoS-aware multicast flow from an ingress router to a set of egress routers is to be supported by the multicast domain 110 in a stateless manner, the configuration of a QoS-aware multicast flow from an ingress router 111 to a set of egress routers 111 may be performed as follows. The ingress router 111 sends an explicit path tree computation request to network controller 120. The explicit path tree computation request includes the required QoS parameters for the QoS-aware multicast flow (e.g., bandwidth, delay, color, affinity, or the like, as well as various combinations thereof). The network controller 120 maintains a centralized TE database (TEDB) of each of the links in the network. The TEDB includes the TE metrics of the links, such as configured bandwidth, available bandwidth (e.g., configured bandwidth minus total bandwidth reserved by existing flows), delay, color, preference, or the like, as well as various combinations thereof. The network controller 120, upon receiving the request from the ingress router 111, computes an explicit path tree that meets the requested QoS and updates the dynamic TE metrics (e.g., configured bandwidth, available bandwidth, and the like) on the links by reserving the QoS resources required by the QoS-aware multicast flow. The network controller 120 responds to the ingress router 111 with the explicit path tree, which is represented as the set of nodes (egress routers) and adjacencies that form the explicit path tree. The ingress router 111 may then use the explicit path tree from the network controller 120 to send packets of the QoS-aware multicast flow.

When a QoS-aware multicast flow from an ingress router to a set of egress routers is to be supported by the multicast domain 110 in a stateless manner, handling of the QoS-aware multicast flow from the ingress router 111 to the set of egress routers 111 may be performed as follows. When the ingress router 111 needs to send a packet for the multicast flow, the ingress router 111 pushes an address list onto the packet, wherein the address list includes the node addresses of the egress routers 111 of the multicast group and the adjacency addresses for the adjacencies that form the explicit path tree to the egress routers 111. In various example embodiments presented herein, this list is referred to as an "Explicit Multicast Route—Traffic Engineered" (EMR-TE) or, similarly, as a "Traffic Engineered Explicit Multicast Route", and a packet that includes an EMR-TE may be referred to herein as an EMR-TE packet. When a router 111 receives an EMR-TE packet, the router 111 inspects the EMR-TE for its own node address and forward connected adjacency addresses. If the router 111 finds its own node address in the EMR-TE, then the router 111 is one of the egress routers 111 of the packet, so the router 111 makes a local copy of the EMR-TE packet, removes the EMR-TE from the local copy of the EMR-TE packet to form a local packet, and forwards the local packet further based on its native header. If the router 111 finds any of its forward connected adjacency addresses in the EMR-TE, then the router 111 removes those forward connected adjacency addresses from the EMR-TE and forwards a copy of the EMR-TE packet to each of the forward connected adjacencies. Following this method of forwarding along the explicit path tree, each of the egress routers of the multicast group receives a copy of the multicast packet. The multicast packet strictly follows the explicit path tree for the QoS-aware multicast flow. It will be appreciated that this process may be further understood by considering the following example based on FIG. 1.

In this example, assume that the source of the multicast flow is LAN 101-1, which is the local network of router 111-1, and that the packets for the multicast flow are received by LANs 101-2, 101-3, 101-4, and 101-7, which are local networks of routers 111-2, 111-3, 111-4, and 111-7, respectively. Thus, within the multicast domain 110, router 111-1 is the ingress router and routers 111-2, 111-3, 111-4, and 111-7 are the egress routers of the multicast flow. The router 111-1 intends to send the multicast flow along a traffic engineered explicit path tree that meets the QoS requirements of the multicast flow. The ingress router 111-1 sends a request to the network controller for computing the explicit path tree with the required QoS. The explicit path tree computed by the network controller 120 includes the nodes {R2, R3, R4, R7} and the following forward connected adjacencies: (1) from 111-1=R1→R5, (2) from 111-5={R5→R2, R5→R7}, and (3) from 111-7={R7→R3, R7→R4}. It is noted that router 111-7 is a bud router, since it is both a transit router and a leaf router in the explicit path tree. The network controller 120 responds to ingress router 111-1 with the explicit path tree as the set of node and adjacency addresses that form the explicit path tree, as follows: {IP-51, IP-25, IP-75, IP-37, IP-47, IP-2, IP-3, IP-4, IP-7}. This explicit path tree is marked with dashed lines in FIG. 1.

In this example, for any packet for the multicast flow that is received from LAN 101-1, ingress router 111-1 pushes an EMR-TE that encodes the addresses of the adjacencies in the explicit path tree and node addresses of the egress routers, as follows: {IP-51, IP-25, IP-75, IP-37, IP-47, IP-2, IP-3, IP-4, IP-7}. The ingress router 111-1, to forward the packet, looks up each address in the EMR-TE in its IP Route Table (which is depicted in FIG. 2A). IP-51 is the only forward connected adjacency of ingress router 111-1, so ingress router 111-1 removes IP-51 from the EMR-TE and forwards the packet over R1→R5 with EMR-TE={IP-25, IP-75, IP-37, IP-47, IP-2, IP-3, IP-4, IP-7}.

In this example, the packet forwarded on R1→R5 is received by router 111-5 with EMR-TE={IP-25, IP-75, IP-37, IP-47, IP-2, IP-3, IP-4, IP-7}. The router 111-5 looks up each address in the EMR-TE in its IP Route Table (which is depicted in FIG. 2E). From the lookup, the router 111-5 finds IP-25 and IP-75 as the two forward connected adjacencies R5→R2 and R5→R7, respectively. So, the router 111-5 removes the two addresses from the EMR-TE and forwards a copy to each adjacency with EMR-TE={IP-37, IP-47, IP-2, IP-3, IP-4, IP-7}.

In this example, the copy forwarded on R5→R2 is received by router 111-2 with EMR-TE={IP-37, IP-47, IP-2, IP-3, IP-4, IP-7}. The router 111-2 looks up each address in the EMR-TE in its IP Route Table (which is depicted in FIG. 2A). From the lookup, the router 111-2 finds only IP-2, which identifies itself. So, the router 111-2 removes the EMR-TE from the packet and forwards the packet to LAN 101-2 based on processing of the native header of the packet.

In this example, the copy forwarded on R5→R7 is received by router 111-7 with EMR-TE={IP-37, IP-47, IP-2, IP-3, IP-4, IP-7}. The router 111-7 looks up each address in the EMR-TE in its IP Route Table (which is depicted in FIG. 2G). From the lookup, the router 111-7 finds IP-7 identifies itself, so it makes a local copy of the packet, removes EMR-TE from the copy, and forwards the local copy to the LAN 101-7 based on processing the native header of the copy. From the lookup, the router 111-7 also finds IP-37 and IP-47 as the two forward connected adjacencies R7→R3 and R7→R4 respectively. So, the router 111-7 removes the addresses {IP-37, IP-47} from the EMR-TE and forwards a copy to each adjacency with EMR-TE={IP-2, IP-3, IP-4}.

In this example, the copy forwarded on R7→R3 is received by router 111-3 with EMR-TE={IP-2, IP-3, IP-4}. The router 111-3 looks up each address in the EMR-TE in its IP Route Table (which is depicted in FIG. 2C). From the lookup, the router 111-3 finds only IP-3, which identifies itself. So, the router 111-3 removes the EMR-TE from the packet and forwards the packet to the LAN 101-3 based on processing of the native header of the packet.

In this example, the copy forwarded on R7→R4 is received by router 111-4 with EMR-TE={IP-2, IP-3, IP-4}. The router 111-4 looks up each address in the EMR-TE in its IP Route Table (which is depicted in FIG. 2D). From the lookup, the router 111-4 finds only IP-4, which identifies itself. So, the router 111-4 removes the EMR-TE from the packet and forwards the packet to the LAN 101-4 based on processing of the native header of the packet.

When a QoS-aware multicast flow from an ingress router to a set of egress routers is to be supported by the multicast domain 110 in a stateless manner, as further described in the previous example, handling of the QoS-aware multicast flow from the ingress router 111 to the set of egress routers 111 may be performed as follows. A forwarding router 111 looks up each address in the EMR-TE of an EMR-TE packet in its IP Route Table, and entries marked as local node address and forward connected adjacency addresses are used to forward EMR-TE packet. The forwarding router 111 partitions the EMR-TE packet based on forward connected adjacencies and then sends the partitioned EMR-TE packets to their respective adjacencies (next hops). If an address received in the EMR-TE has no forwarding context in the IP Route Table of the forwarding router, then the address is included "as is" in the forwarded EMR-TE packet(s). In this manner, packets of a QoS-aware multicast flow may be sent over an explicit path tree in a stateless manner.

It will be appreciated that, although primarily described thus far within the context of supporting stateless IP multicast TE in a network domain composed of a single domain, in at least some example embodiments IP multicast TE may be supported in a network domain composed of multiple sub-domains. It is noted that this may be considered to be a stateless approach or a quasi-stateful approach. The use of multiple sub-domains enables an ingress router to multicast a packet without the size of the EMR-TE growing linearly with the number of nodes and adjacencies that form the explicit path tree (i.e., such that the handling of the EMR-TE packet is not a linear process O(N) where N is the number of addresses encoded in the EMR-TE), such that the ingress router can multicast a packet on a large explicit path tree with a smaller-size EMR-TE.

Figure 3:
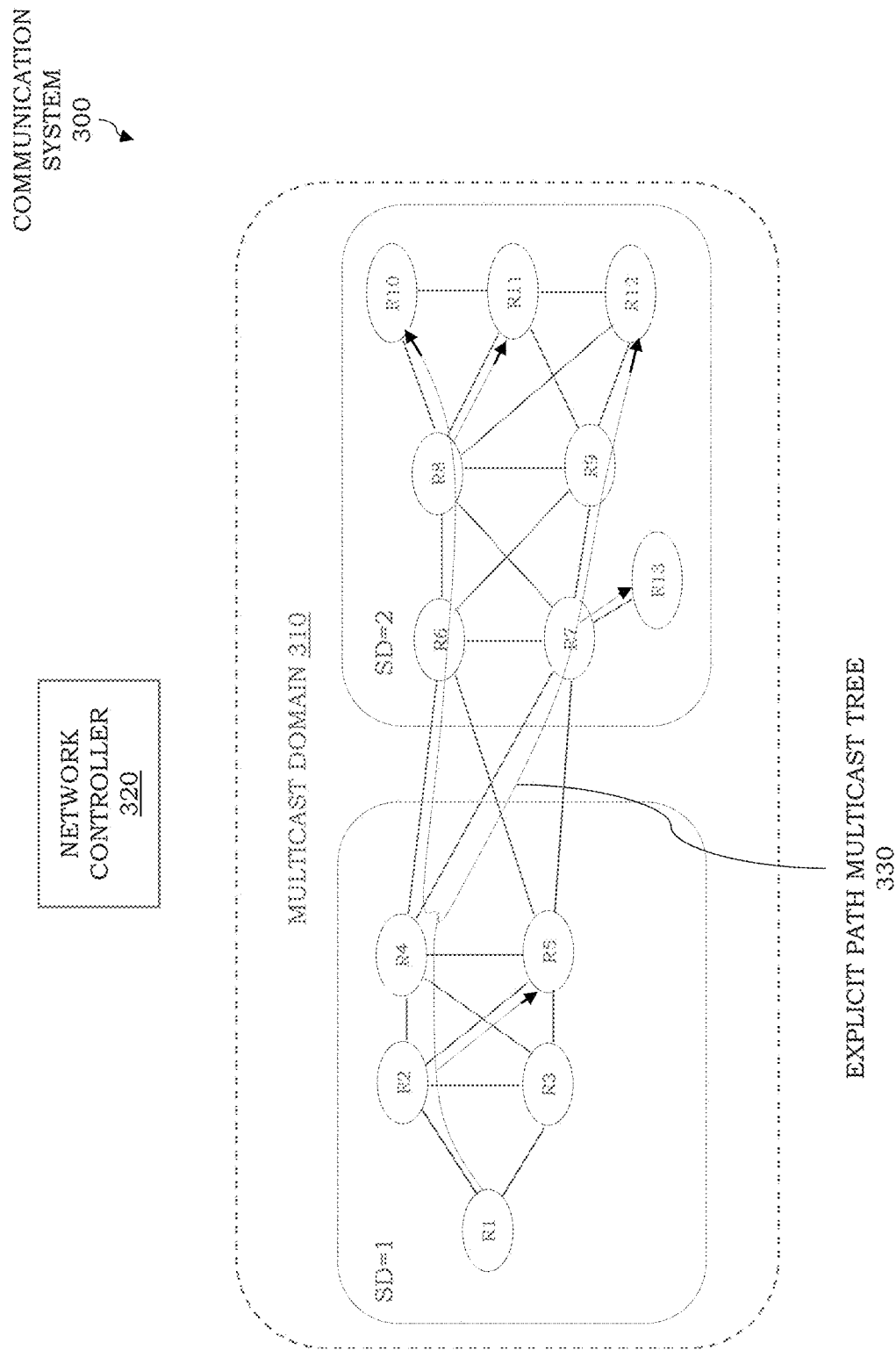
FIG. 3 depicts an example embodiment of a communication system configured to support stateless multicast in a multi-domain packet distribution network.

FIG. 3 depicts an example embodiment of a communication system configured to support stateless multicast in a multi-domain packet distribution network.

The communication system 300 includes a multicast domain 310 which is controlled by a network controller 320. The multicast domain 310 includes thirteen routers (denoted as R1-R13, respectively). The multicast domain 310 is divided into two sub-domains (denoted as SDT and SD2). The routers R1-R5 are members of SDT and the routers R6-R13 are members of SD 2. It will be appreciated that more than two SDs may be used. It is noted that an SD may be limited by the maximum number of routers and adjacencies it allows. The node address for router Rx is denoted as IP-x and the adjacency address for adjacency Rx→Ry is denoted as IP-y_x. An ingress router, to send a packet for the multicast flow, pushes the EMR-TE including the node and adjacency addresses for the subset of the explicit path tree within its local SD, and a Tree-and-Gateway (TAG) address for each border router in adjoining SDs where a TAG is a tuple {Gateway Address, Tree Address} that encodes the node address of the border router as the "Gateway Address" and encodes the tree address of a subtree programmed in the border router as the "Tree Address". In the border router, the Tree Address maps to the EMR-TE that includes the node and adjacency addresses of the subtree. When an EMR-TE packet traverses a specific SD then, within the SD, the EMR-TE packet encodes the addresses of the subset of nodes and adjacencies that belong to that SD only. For a multi-domain explicit path tree, the EMR-TE packet does not have to encode the nodes and adjacencies of the entire tree, so the size of EMR-TE does not grow linearly with the size of the multi-domain tree.

As an example, for a specific multicast flow, assume that R1 is the ingress router and R5 and R10-R13 are the egress (leaf) routers. The network controller 320 computes an explicit path multicast tree 330 that spans across SD 1 and SD 2. R6 and R7 are the border routers of SD 2, through which the explicit path tree enters SD 2. So, R6 and R7 are ingress routers of two subtrees, in SD 2, of the explicit path tree. The controller allocates a tree address in a border router from its local tree address space (e.g., a reserved block of IP addresses exclusively used for tree addresses) that maps to the EMR-TE including the node addresses and adjacency addresses of the subtree. For example, assume that the tree address allocated in R6 is TA6 (which maps to the EMR-TE={IP-8_6, IP-10_8, IP-118, IP-10, IP-11}) and the tree address allocated in R7 is TA7 (which maps to the EMR-TE={IP-97, IP-12_9, IP-137, IP-12, IP-13}).

In this example, to send a packet in the exemplary multicast flow, R1 encodes the EMR-TE-={IP-5_2, IP-4_2, IP-5, IP-6_4, IP-7_4, TAG={IP-6, TA6}, TAG={IP-7, TA7}} and pushes the EMR-TE onto the packet. R1 sends the EMR-TE packet to R2.

R2 replicates the EMR-TE packet into following two copies: (1) Copy-1: EMR-TE={IP-5, IP-6_4, IP-7_4, TAG={IP-6, TA6}, TAG={IP-7, TA7}} which is sent to R2→R4 and (2) Copy-2: EMR-TE={IP-5, IP-6_4, IP-7_4, TAG={IP-6, TA6}, TAG={IP-7, TA7}} which is sent to R2→R5. It is noted that R2 looks up the Gateway Address of a TAG in its IP Route Table and does not find it as local entry. So, it passes on the TAG in the EMR-TE to the forwarded packet(s). This procedure applies at each forwarding router.

When R4 receives Copy-1, it replicates the packet into following two copies: (1) Copy-3: EMR-TE={IP-5, TAG={IP-6, TA6}, TAG={IP-7, TA7}} which is sent to R4→R6 and (2) Copy-4: EMR-TE={IP-5, TAG={IP-6, TA6}, TAG={IP-7, TA7}} which is sent to R4→R7.

When R5 receives Copy-2, the address IP-5 in its IP Route Table indicates that it is the egress router and that there are no forward connected adjacency on the remaining addresses and, thus, R5 strips the EMR-TE- and handles the packet based on its native header.

When R6 receives Copy-3, R6 finds that it is the border router for TAG={IP-6, TA6}, since Gateway Address IP-6 is programmed as local (self) in its IP Route Table, and, thus, R6 translates the Tree Address TA6 to EMR-TE={IP-8_6, IP-10_8, IP-11_8, IP-10, IP-11}. None of the other labels in Copy-3 have any forward connected adjacency in R6. So, R6 processes the EMR-TE mapped to TA6 alone and generates the following copy: Copy-5: EMR-TE={IP-108, IP-11_8, IP-10, IP-11} which is sent to R6→R8.

When R7 receives Copy-4, it finds that it is the border router for TAG={IP-7, TA7}, since Gateway Address in IP-7 is programmed as local (self) in its IP Route Table, and, thus, R7 translates the Tree Address TA7 to EMR-TE={IP-9_7, IP-12_9, IP-13_7, IP-12, IP-13}. None of the other labels in Copy-4 have any forward connected adjacency in R7. So, R7 processes the EMR-TE mapped to TA7 alone, and generates the following two copies: (1) Copy-6: EMR-TE={IP-12_9, IP-12, IP-13} which is sent to R7→R9 and (2) Copy-7: EMR-TE={IP-12_9, IP-12, IP-13} which is sent to R7→R13.

When R8 receives Copy-5, it replicates it into following two copies: (1) Copy-8: EMR-TE={IP-10, IP-11} which is sent to R8→R10 and (2) Copy-9: EMR-TE={IP-10, IP-11} which is sent to R8→R11. When R9 receives Copy-6, it sends the following copy: Copy-10: EMR-TE={IP-12, IP-13}, which is sent to R9→R12.

When R13 receives Copy-7, the address IP-13 in its IP Route Table indicates that it is the egress router and that there is no forward connected adjacency on the remaining addresses. So, R13 strips the EMR-TE and handles the packet based on its native header.

When R10 receives Copy-8, the address IP-10 in its IP Route Table indicates that it is the egress router and that there is no forward connected adjacency on the remaining addresses. So, R10 strips the EMR-TE and handles the packet based on its native header.

When R11 receives Copy-9, the address IP-11 in its IP Route Table indicates that it is the egress router and that there is no forward connected adjacency on the remaining addresses. So, R11 strips the EMR-TE and handles the packet based on its native header.

When R12 receives Copy-10, the address IP-12 in its IP Route Table indicates that it is the egress router and that there is no forward connected adjacency on the remaining labels. So, R12 strips the EMR-TE and handles the packet based on its native header.

It will be appreciated that the TAG may be formatted in various ways, an example embodiment of which is presented in FIG. 4.

FIG. 4 depicts an example embodiment of a tree-and-gateway (TAG) format including a tree address and a gateway address. The TAG format 400 includes a Tree Address field including a tree address and a Gateway Address field including a gateway address of a gateway router. The tree address is an IP address that identifies a stateless IP multicast TE tree that originates at the gateway router. The tree address maps to an EMR-TE that encodes the node and adjacency addresses of an explicit path tree rooted at the router that programmed the Tree Address. The gateway address is an IP address that identifies a node address in the gateway router. When an IP Address in an EMR-TE route is identified as a tree address (e.g., the address is from a tree address space, then the receiver will interpret the next IP address in the list as the gateway address (i.e., the identification of the preceding address as being from a tree address space enables the receiving router to identify the presence of the TAG in the EMR-TE route). A forwarding router along the explicit path tree does not make any forwarding decision on the EMR-TE packet based on the Gateway Address unless it is the Gateway Router; rather, any router along the path that is not the gateway router simply forwards the TAG in the EMR-TE packet(s) along the tree until the TAG reaches the gateway router. The use of the TAG is discussed further below.

Various example embodiments are configured to support the concept of stateless IP multicast TE, in which a packet is sent on a stateless explicit path tree by pushing a list of IP addresses onto the multicast packet where the IP addresses uniquely identify the nodes (egress routers) and adjacencies that form the explicit path tree to be traversed by the packet. The explicit path tree is computed in such a way that it guarantees the QoS requirements of the multicast flow with which the packet is associated. As the packet traverses the tree, each router along the tree scans the list of IP addresses on the received packet to look for the node address that identifies itself and/or adjacency addresses that are forward connected in the router (i.e., from the router to a neighbor). If the local node address is found, then the router makes a local copy of the packet, removes the address list from the local copy of the packet, and forwards the local copy of the packet to the local context at the router. If forward connected adjacency addresses are found, then the router removes all such addresses from the address list and forwards a copy of the packet (with the remaining addresses in the list) to each of the forward connected adjacencies. These and various other example embodiments are described further below.

In at least some example embodiments, the EMR-TE may be supported for IPv4. In IPv4, the EMR-TE is implemented as a list of IPv4 addresses where each of the IPv4 addresses in the list identifies: (1) an IPv4 node address of an egress router (or gateway router) that receives the multicast packet, (2) an IPv4 adjacency address that forwards the multicast packet, or (3) part of an IPv4 TAG Address. It will be appreciated that an encoding of an IPv4 TAG Address is presented in FIG. 4. As discussed further below, the EMR-TE may be encoded in IPv4 as an IPv4 Header Option, as an IP Shim Protocol, or the like.

In at least some example embodiments, the EMR-TE may be encoded in IPv4 as an IPv4 Header Option. The IPv4 base specification (RFC 791) describes several Options that can be appended to the IPv4 header, as illustrated in FIG. 5. The Options provide the control functions needed or useful in some situations, but unnecessary for the most common communications. The Options include provisions for time-stamps, security, and special routing. The only router that is allowed to inspect the IPv4 Option(s) is the router that corresponds to the Destination Address (DA) of the IPv4 packet. In IPv4, Options start with a 1-octet Type field, followed by type-specific encoding. Options are of variable length. The minimum size of an Option is 1-octet (i.e., only the Type field exists) if it does not have any type-specific data while the maximum size of an Option is limited by maximum permissible value of the Internet Header Length (IHL) field in the IPV4 Header. The 1-octet Type field is viewed as being composed of the following three fields: (1) a 1-bit Copied Flag field, (2) a 2-bit Option Class field, and (3) a 5-bit Option Number field. The Copied Flag field provides an indication as to whether the Option is to be copied into all fragments on fragmentation of the IPv4 packet (e.g., "0"=not copied and "1"=copied). The Options Classes field may support the following Option classes: 0=control, 1=reserved for future use, 2=debugging and measurement, 3=reserved for future use. In at least some example embodiments, a new IPv4 Option may be defined for EMR-TE. An example of a definition of a new IPv4 Option for EMR-TE is presented in FIG. 5. As depicted in FIG. 5, the new IPv4 Option for EMR-TE may have Copy=1, Class=0, and Option Number=18 (which may be reserved from the unallocated values in the IANA IPv4 parameters registry, although it will be appreciated that any other suitable value may be used for the Option Number portion of the Type field in the IPv4 Header). The definition of the new IPv4 Option for EMR-TE indicates that the new IPv4 Option is to be used for stateless multicast of Internet datagrams based on EMR-TE information supplied by the source. An example embodiment of a format of an IPV4 EMR-TE Option is presented in FIG. 6.

Figure 6:
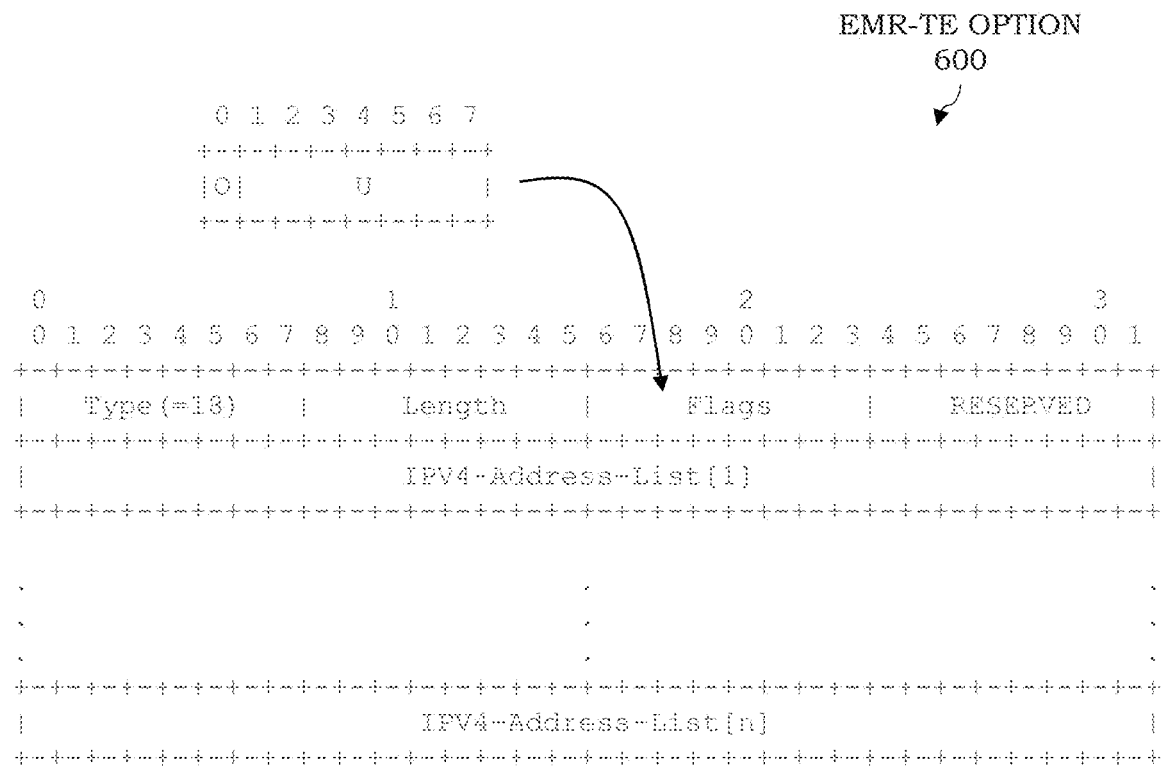
FIG. 6 depicts an example embodiment of a format of an IPv4 EMR-TE Option for use in an IPv4 Header.

FIG. 6 depicts an example embodiment of a format of an IPv4 EMR-TE Option for use in an IPv4 Header. The IPv4 EMR-TE Option includes a Type field, a Length field, a Flags field, and an IPv4-Address-List field. The Type field is a 1-octet field that indicates EMR-TE Option type option in tuples of Copy, Class, and Number. The value of the Type field is 146. The Length field is a 1-octet field that indicates the length of EMR-TE Option that includes the Type octet, the Length octet, the Flags octet, the Reserved octet, and the octets of the IPV4-Address-List. The Flags field, as illustrated in FIG. 6, is an 8-bit field including an O-flag in the first bit and 7 unused (U) bits. The O-flag is an OAM flag (e.g., when set, this bit indicates that the packet is an OAM packet). The unused (U) bits of the Flags field are unused and reserved for future use (e.g., the bits may be unset on transmission and ignored on receipt). The Reserved field, which is unused and reserved for future use, is unset on transmission and ignored on receipt. The IPV4-Address-List field includes a list of n IPv4 Addresses that represent addresses of the explicit path tree (e.g., each IPv4 address in the IPV4-Address-List field is a node address in the explicit path tree, an adjacency address in the explicit path tree, or a tree address of a gateway router in the explicit path tree).

The EMR-TE, as indicated above, may be encoded in IPv4 as an IPv4 Option. It will be appreciated that the EMR-TE header is only expected to appear once in the packet. It will be appreciated that the only node expected to inspect the IPv4 EMR-TE Option is the node corresponding to DA of the packet, which implies that the IPv4 address of the next hop of the EMR-TE packet will be set as the DA of the packet and that the DA of the packet will change at each hop of the EMR-TE packet. It is noted that the encoding of an EMR-TE packet may be further understood by way of reference to FIG. 13 (which provides an example of the EMR-TE being pushed on a packet as IPV4-EMR-TE Option).

Figure 7:
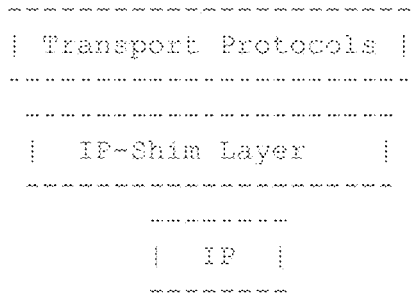
FIG. 7 depicts an example embodiment of a positioning of an IP Shim layer between an IP layer and a transport layer.

In at least some example embodiments, the EMR-TE may be encoded in IPv4 as an IP Shim Protocol. This may overcome certain limitations of encoding the EMR-TE in an IPv4 Options Header. Namely, the IHL field in the IPv4 header has 4 bits, which represents the number of 32-bit words on the IPV4 header, including variable number of IPV4 options. As a 4-bit field, the maximum value is 15 words (15×32 bits, or 480 bits=60 bytes). The minimum value of IHL is 5, which indicates length of 5×32=160 bits=20 bytes, i.e. the fixed size of IPV4 header excluding the Options. This means that the maximum size of Options can be 60-20=40 bytes, which limits the number of IPv4 Addresses that can be included within EMR-TE option to 9 IPv4 addresses. The IP Shim Layer may be a generic layer that may be configured to carry any "enhancement" related to the IP layer. The IP Shim Layer may be inserted between the IP header and the upper-layer/transport protocol header (e.g. TCP, UDP, ICMP, or the like) as depicted in FIG. 7.

In at least some example embodiments, as indicated above, the EMR-TE may be encoded in IPv4 as an IP Shim Protocol. The IP Shim Protocol may encode the EMR-TE using an IPv4-EMR Shim Header. The IPv4-EMR Shim Header, which may be denoted herein as "IPV4-EMR-TE", may be carried as shim for the IPv4 layer. The IP Shim Layer may be carried using an IP Protocol number 145 in the IPv4 Header. An example embodiment of a format of an IPV4-EMR-TE Shim Header is presented in FIG. 8.

Figure 8:
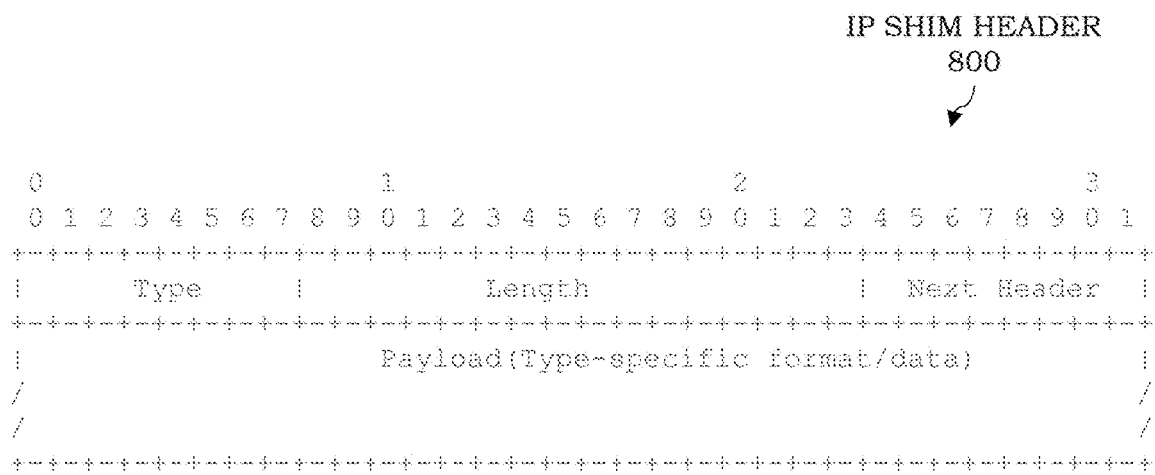
FIG. 8 depicts an example embodiment of a format of an IPv4 Shim Header.

FIG. 8 depicts an example embodiment of a format of an IPV4-EMR-TE Shim Header. The IPV4-EMR-TE Shim Header includes a Type field, a Length field, a Next Header field, and a Payload field. The IP-Shim Protocol is defined as generic and may carry different types within it, and the Type field is an 8-bit field which carries this type. The Length field is a 16-bit field that indicates the length of the payload in octets (the octets of Type, Length and Next Header fields are excluded). Thus, the size of the Payload can be up to 65535 octets. The Next Header field indicates the IP Protocol type of the header next to the IP-Shim Header (e.g., TCP, UDP, ICMP, or the like). The Payload field includes the type-specific format, which may include the IPV4-EMR-TE Shim Header as depicted in FIG. 9.

In at least some example embodiments, as indicated above, the IP Shim Protocol may encode the EMR-TE using an IPv4-EMR Shim Header. The IPv4-EMR Shim Header, which may be denoted herein as "IPV4-EMR-TE", may be carried as shim for the IPv4 layer. The IPv4-EMR Shim Header may have a new Type value assigned thereto in order to indicate that the shim header is an IPv4-EMR-TE Shim Header (e.g., using Type 7 or any other suitable Type value). An example embodiment of a format of an IPV4-EMR-TE Shim Header is presented in FIG. 9.

Figure 9:
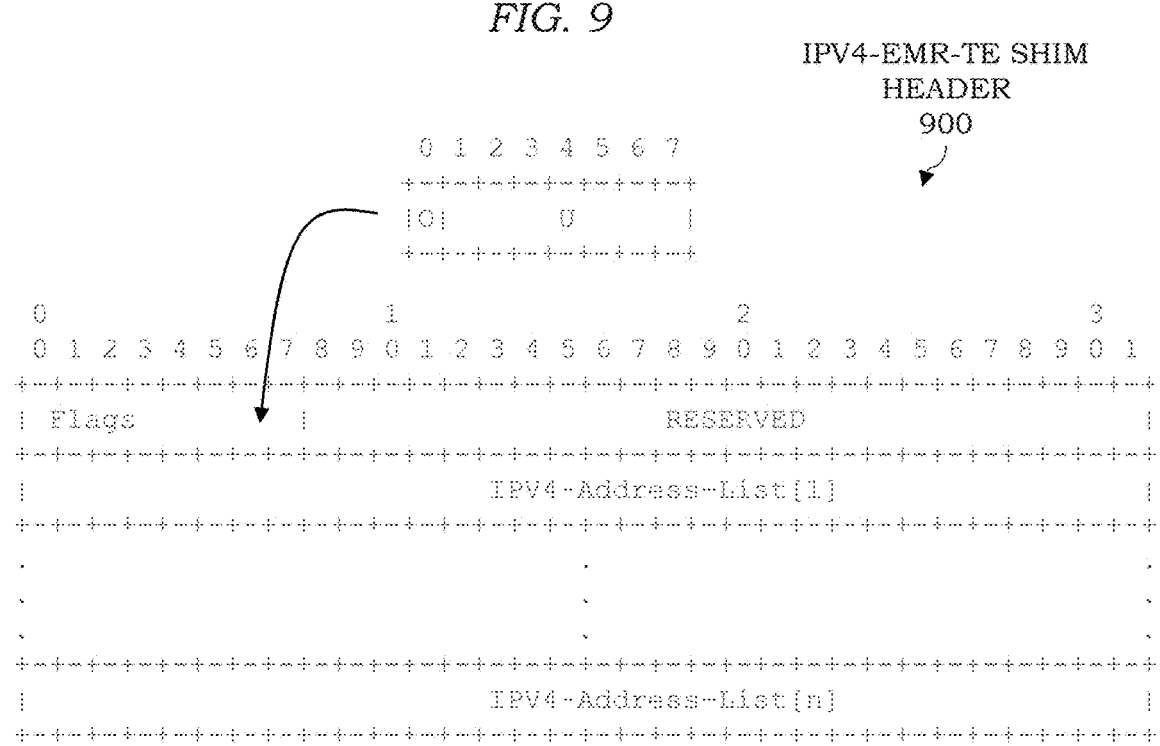
FIG. 9 depicts an example embodiment of a format of an IPV4-EMR-TE Shim Header.

FIG. 9 depicts an example embodiment of a format of an IPV4-EMR-TE Shim Header. The IPV4-EMR-TE Shim Header includes a Flags field, a Reserved field, and an IPV4-Address-List field (from IPV4-Address-List[1] to IPV-Address-List[n]). The Flags field, as illustrated in FIG. 9, is an 8-bit field including an O-flag in the first bit and 7 unused (U) bits. The O-flag is an OAM flag (e.g., when set, this bit indicates that the packet is an OAM packet). The unused (U) bits of the Flags field are unused and reserved for future use (e.g., the bits may be unset on transmission and ignored on receipt). The IPV4-Address-List field includes a list of n IPv4 Addresses that represent addresses of the explicit path tree (e.g., each IPv4 address in the IPV4-Address-List field is a node address in the explicit path tree, an adjacency address in the explicit path tree, or a tree address of a gateway router in the explicit path tree).

The EMR-TE, as indicated above, may be encoded in IPv4 as an IP Shim Protocol. It will be appreciated that the EMR-TE header is only expected to appear once in the packet. It will be appreciated that the only node expected to inspect the IPV4-EMR-TE Shim Header is the node corresponding to DA of the packet, which implies that the IPv4 address of the next hop of the EMR-TE packet will be set as the DA of the packet and that the DA of the packet will change at each hop of the EMR-TE packet. It is noted that the encoding of an EMR-TE packet may be further understood by way of reference to FIG. 13 (which, although presented with respect to an example of the EMR-TE being pushed on a packet as IPV4-EMR-TE Option, may be adapted for encoding of an EMR-TE packet where the EMR-TE is pushed on the packet as IPV4-EMR-TE).

In at least some example embodiments, the EMR-TE may be supported for IPv6. In IPv6, the EMR-TE is implemented as a list of IPv6 addresses where each of the IPv6 addresses in the list identifies: (1) an IPv6 node address of an egress router (or gateway router) that receives the multicast packet, (2) an IPv6 adjacency address that forwards the multicast packet, or (3) part of an IPv6 TAG Address. It will be appreciated that an encoding of an IPv6 TAG Address is presented in FIG. 4. As discussed further below, the EMR-TE may be encoded in IPv6 as an IPv6 Extension Header, as an IP Shim Protocol, or the like.

Figure 10:
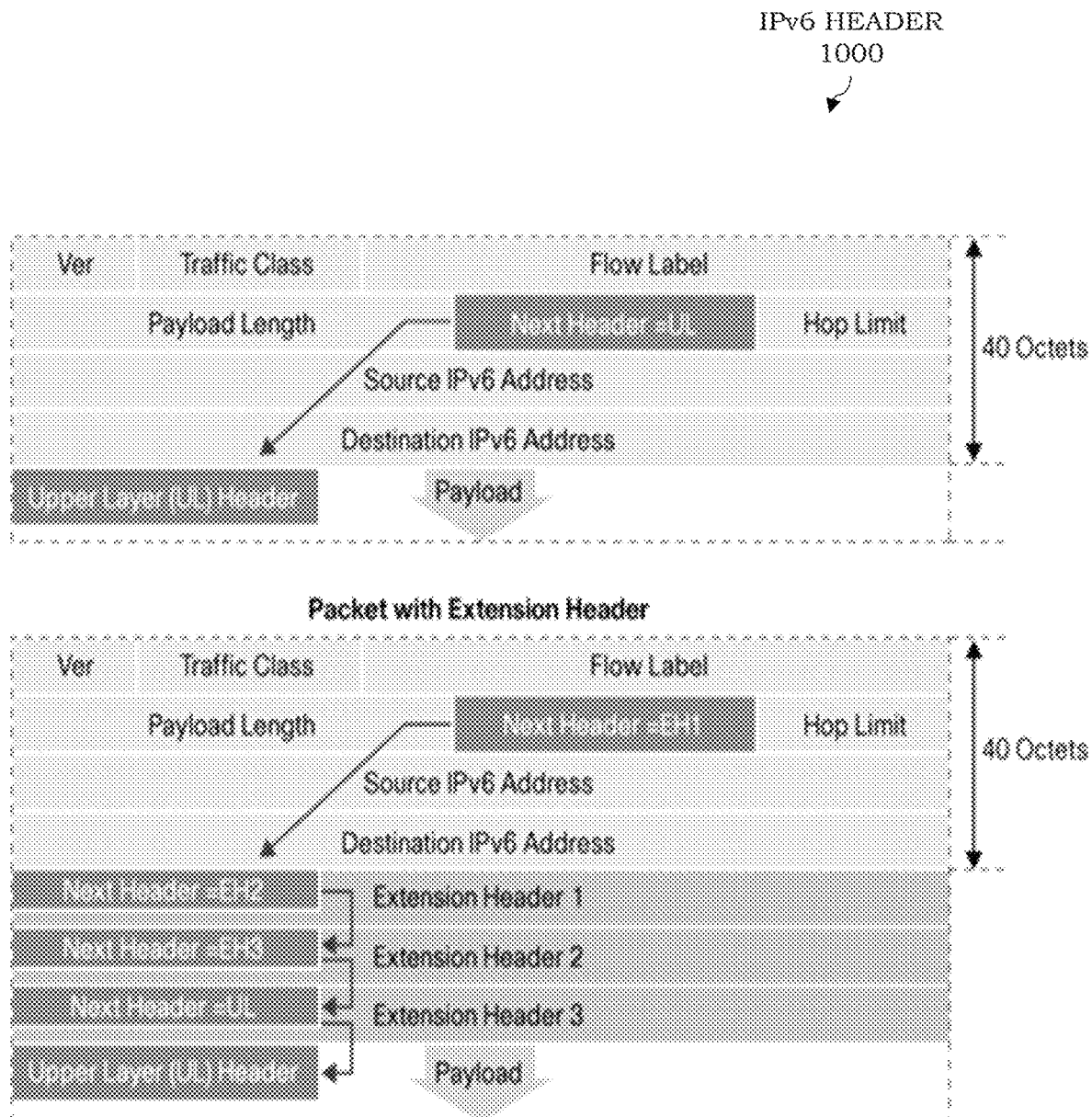
FIG. 10 depicts an example embodiment an IPv6 Header including chaining of IPv6 Extension Headers.

In at least some example embodiments, the EMR-TE may be encoded in IPv6 as an IPv6 Extension Header. Section 4 in RFC 2460 describes several IPv6 Extension Headers (EH) that can be appended to an IPV6 header as depicted in FIG. 10. The main IPv6 header remains fixed in size (40 bytes) while customized EHs are added as needed. The EHs provide for control functions needed or useful in some situations, but unnecessary for the most common communications. The EHs include provisions for timestamps, security, and special routing. In at least some example embodiments, an IPv6 EH may be used to encode an EMR-TE (which may be referred to as an IPv6-EMR EH. The IPv6-EMR EH may have a new Type value assigned thereto in order to indicate that the EH is an IPv6-EMR EH (e.g., using IPv6 EH Type 160, which may be reserved from the unallocated values in the IANA IPv6 parameters registry, or any other suitable Type value). An example embodiment of a format of an IPV6-EMR-TE EH is presented in FIG. 11.

FIG. 11 depicts an example embodiment of a format of an IPV6-EMR-TE EH for use in an IPv6 Header. The IPV6-EMR-TE EH includes a Next Header field, a Header Extension Length (Hdr Ext Len) field, an EMR Type field, a Flags field, and an IPv6-Address-List field. The Next Header field is an 8-bit selector that identifies the type of header immediately following the EMR-TE header. The Header Extension Length field is an 8-bit unsigned integer which encodes the length of the EMR-TE header in 8-octet units, not including the first 8 octets. The Header Extension Length field is equal to two times the number of IPv6 Addresses in the header. The EMR Type field defines the EMR Type of the EMR-TE (e.g., Type 0 of any other suitable type). The Flags field, as illustrated in FIG. 11, is an 8-bit field including an O-flag in the first bit and 7 unused (U) bits. The O-flag is an OAM flag (e.g., when set, this bit indicates that the packet is an OAM packet). The unused (U) bits of the Flags field are unused and reserved for future use (e.g., the bits may be unset on transmission and ignored on receipt). The IPV6-Address-List field includes a list of n IPv6 Addresses that represent addresses of the explicit path tree (e.g., each IPv6 address in the IPV6-Address-List field is a node address in the explicit path tree, an adjacency address in the explicit path tree, or a tree address of a gateway router in the explicit path tree).

The EMR-TE, as indicated above, may be encoded in IPv6 as an IPv6 EH. It will be appreciated that the EMR-TE header is only expected to appear once in the packet. It will be appreciated that the only node expected to inspect the IPV6-EMR-TE EH is the node corresponding to DA of the packet, which implies that the IPv6 address of the next hop of the EMR-TE packet will be set as the DA of the packet and that the DA of the packet will change at each hop of the EMR-TE packet. It is noted that the encoding of an EMR-TE packet may be further understood by way of reference to FIG. 13 (which, although presented with respect to an example of the EMR-TE being pushed on a packet as IPV4-EMR-TE Option, may be adapted for encoding of an EMR-TE packet where the EMR-TE is pushed on the packet as IPV6-EMR-TE EH).

In at least some example embodiments, the EMR-TE may be encoded in IPv6 as an IP Shim Protocol. The IP Shim Protocol may encode the EMR-TE using an IPv6-EMR-TE Shim Header. The IPv6-EMR-TE Shim Header, which may be denoted herein as "IPV6-EMR-TE", may be carried as a shim for the IPv6 layer. The IPv6-EMR-TE Shim Header may have a new Type value assigned thereto in order to indicate that the shim header is an IPv6-EMR-TE Shim Header (e.g., using Type 8 or any other suitable Type value). An example embodiment of a format of an IPV6-EMR-TE Shim Header is presented in FIG. 12.

FIG. 12 depicts an example embodiment of a format of an IPV6-EMR-TE Shim Header. The IPV6-EMR-TE Shim Header includes a Flags field, a Reserved field, and an IPV6-Address-List field (from IPV6-Address-List[1] to IPV6-Address-List[n]). The Flags field, as illustrated in FIG. 12, is an 8-bit field including an O-flag in the first bit, a C-flag in the second bit, and 6 unused (U) bits. The O-flag is an OAM flag (e.g., when set, this bit indicates that the packet is an OAM packet). The unused (U) bits of the Flags field are unused and reserved for future use (e.g., the bits may be unset on transmission and ignored on receipt). The IPV6-Address-List field includes a list of n IPv6 Addresses that represent addresses of the explicit path tree (e.g., each IPv6 address in the IPV6-Address-List field is a node address in the explicit path tree, an adjacency address in the explicit path tree, or a tree address of a gateway router in the explicit path tree).

The EMR-TE, as indicated above, may be encoded in IPv6 as an IP Shim Protocol. It will be appreciated that the EMR-TE header is only expected to appear once in the packet. It will be appreciated that the only node expected to inspect the IPV6-EMR-TE Shim Header is the node corresponding to DA of the packet, which implies that the IPv6 address of the next hop of the EMR-TE packet will be set as the DA of the packet and that the DA of the packet will change at each hop of the EMR-TE packet. It is noted that the encoding of an EMR-TE packet may be further understood by way of reference to FIG. 13 (which, although presented with respect to an example of the EMR-TE being pushed on a packet as IPV4-EMR-TE Option, may be adapted for encoding of an EMR-TE packet where the EMR-TE is pushed on the packet as IPV6-EMR-TE).

FIG. 13 depicts an example embodiment of an encoding of an EMR-TE packet where the EMR-TE being is pushed on the packet as IPV4-EMR-TE Option. The EMR-TE={IP-25, IP-75, IP-37, IP-47, IP-2, IP-3, IP-4, IP-7} is pushed by the ingress router 111-1 into a packet of the exemplary multicast flow of FIG. 1. The EMR-TE is encoded here as an IPV4-EMR-TE Option within an IPv4 Header of an IPv4 packet. The IPv4 Header of the packet include a Source Address (SA)=IP-1, a Destination Address (DA)=IP-51, and the IPV4-EMR-TE Option that is presented in FIG. 13. The Type field in the IPV4-EMR-TE Option is set to 145 to indicate the type as EMR-TE. There are eight addresses in the address list, which consumes 32 octets. As such, the Length field is set to 36 (=32 octets of addresses+4 octets of options header). It will be appreciated that, although omitted for purposes of clarity, similar EMR-TE packets for the EMR-TE={IP-25, IP-75, IP-37, IP-47, IP-2, IP-3, IP-4, IP-7} may be generated based on use of an IPv4 Shim Protocol (for IPv4 addresses), an IPv6 Extension Header (for IPv6 addresses), or an IPv6 Shim Protocol (for IPv6 addresses).

In various embodiments, the TEDB is used for support stateless multicast in a stateless IP multicast TE domain. A controller maintains the TEDB for the stateless IP multicast TE domain for TE resources management and for computation of explicit path tree based on QoS constraints. At a high-level, the TEDB includes the following components: (1) status and static TE metrics (e.g., bandwidth, delay, color, affinity, and the like) of each adjacency in the domain and (2) TE resources reserved on the adjacencies by currently active explicit path trees. It will be appreciated that (2) cannot exist with (1) since (1) is the fundamental basis of the TEDB. The controller may build (1) in a number of ways, such as by periodic polling on adjacency status and associated static TE metrics, use of routing protocols (e.g., OSPF, OSPFv3, IS-IS, BGP-LS or the like) that flood the status and static TE metrics for each adjacency in the network, or the like, as well as various combinations thereof.

In at least some example embodiments, as discussed herein, implementation of a stateless IP multicast TE architecture based on EMR-TE may be based on configuration of the explicit path tree as discussed herein. When a multicast flow with a required QoS is setup by an ingress router, it triggers configuration of the explicit path tree that meets the QoS of the flow. The Ingress router sends a tree computation request to controller for the set of egress routers of the flow and the required QoS. The controller, based on the tree computation request from the ingress router, computes the explicit path tree, based on the TEDB, such that the explicit path tree meets the required QoS. The controller updates the dynamic TE metrics (e.g., available bandwidth and the like) of the adjacencies along the explicit path tree based on the QoS resources reserved by the explicit path tree. The controller records the explicit path tree in its database and responds to the ingress router with the explicit tree in the form of a set of node and adjacency addresses. The ingress router receives the explicit path tree from the controller, at which point the configuration process for the explicit path tree is complete and the explicit path tree may be used for sending packets of the multicast flow. It will be appreciated that various example embodiments of methods for supporting such functions are provided in FIGS. 14-21.

Figure 14:
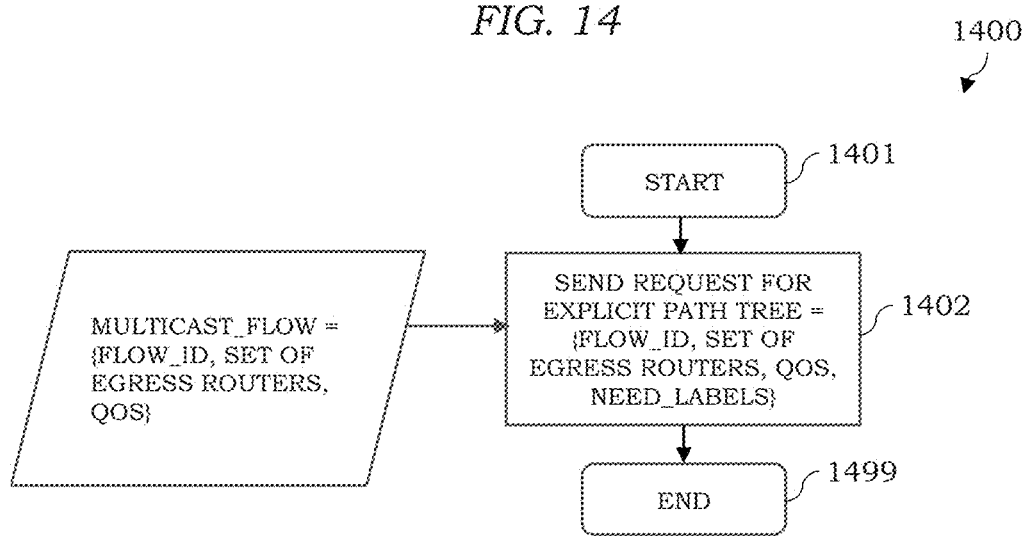
FIG. 14 depicts an example embodiment of a method for use by an ingress router for triggering configuration of an explicit path tree by a controller.

FIG. 14 depicts an example embodiment of a method for use by an ingress router for triggering configuration of an explicit path tree by a controller. It will be appreciated that, although primarily presented as being performed serially, at least a portion of the functions of method 1400 may be performed contemporaneously or in a different order than as presented with respect to FIG. 14. The inputs to the method 1400 include the locally assigned identifier for a multicast flow, the set of egress routers for the multicast flow, and the required QoS for the multicast flow. At block 1401, the method 1400 begins. Block 1402 sends, to the controller, the request for an explicit path tree for the multicast flow, where the request includes the locally assigned identifier for the multicast flow, the set of egress routers for the multicast flow, and the required QoS for the multicast flow. At block 1499, the method 1400 ends.

Figure 15:
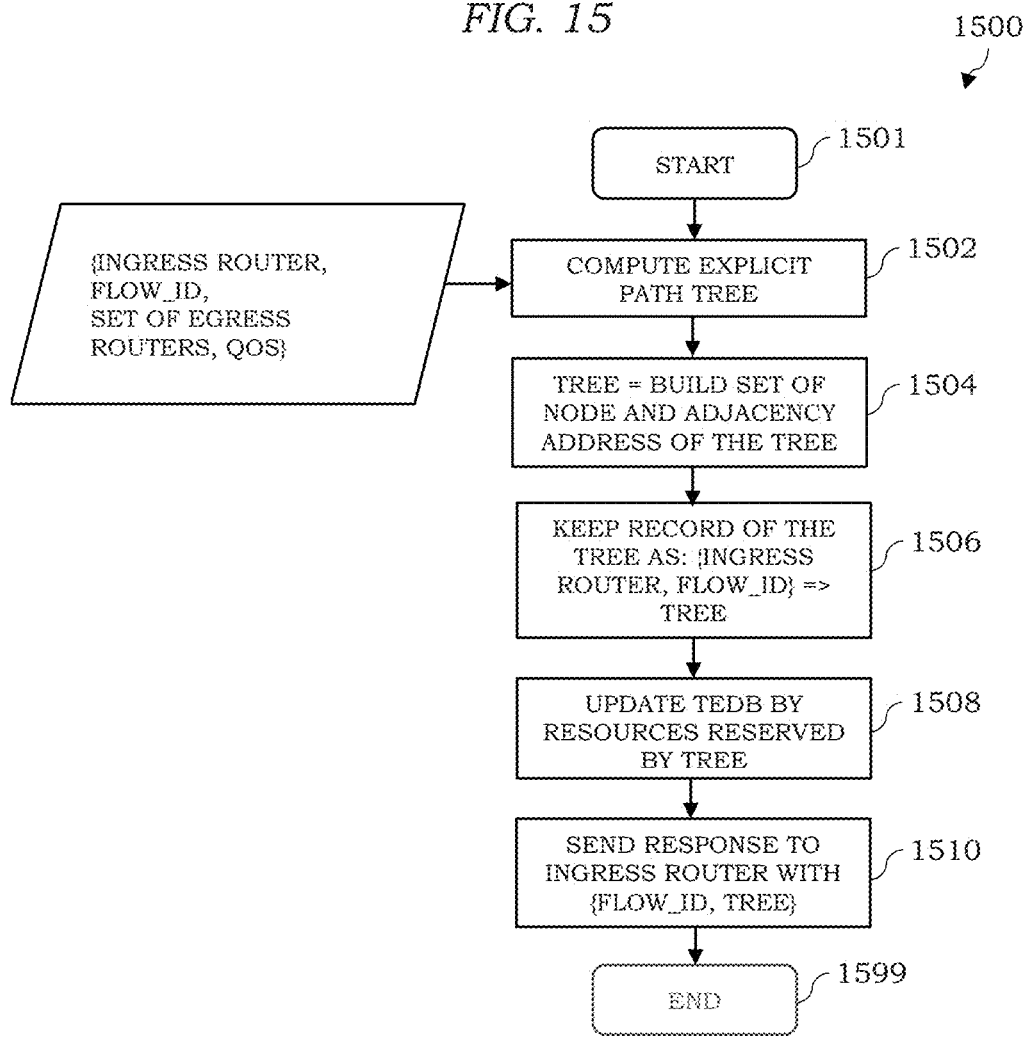
FIG. 15 depicts an example embodiment of a method for use by a controller for processing an explicit path tree request from an ingress router.

FIG. 15 depicts an example embodiment of a method for use by a controller for processing an explicit path tree request from an ingress router. It will be appreciated that, although primarily presented as being performed serially, at least a portion of the functions of method 1500 may be performed contemporaneously or in a different order than as presented with respect to FIG. 15. The inputs to the method 1500 include an indication of the ingress router that sent the request for the explicit path tree, the multicast flow identifier assigned by the ingress node, the set of egress routers of the multicast flow, and a set of parameters describing the QoS requirements for the multicast flow. At block 1501, the method 1500 begins. Block 1502 computes the explicit path tree based on TEDB and the requested QoS parameters, and the method then proceeds to block 1504. It will be appreciated that various algorithms may be used for computation of an explicit path tree based on QoS constraints. Block 1504 builds the explicit path tree to be sent to the ingress router, as the "ordered set" of node and adjacency addresses resulting from the computation at block 1502, and the method 1500 then proceeds to block 1506. It will be appreciated that the set is considered to be ordered because the nodes and adjacencies are ordered in the set according to their occurrences along the explicit path tree (although it is noted that, when a subset of adjacencies forms branches at a transit router then those adjacencies can be put in any order within the subset). Block 1506 keeps a record of the mapping of {ingress router, multicast flow identifier} to the explicit path tree, and the method 1500 then proceeds to block 1508. Block 1508 reserves the QoS resources used by the explicit path tree in the TEDB, and the method then proceeds to block 1510. For example, available bandwidth of the adjacencies used by the explicit path tree are updated in TEDB after deduction of the bandwidth reserved by the explicit path tree. Block 1510 sends the response to the ingress router with the multicast flow identifier and the explicit path tree. At block 1599, the method 1500 ends.

Figure 16:
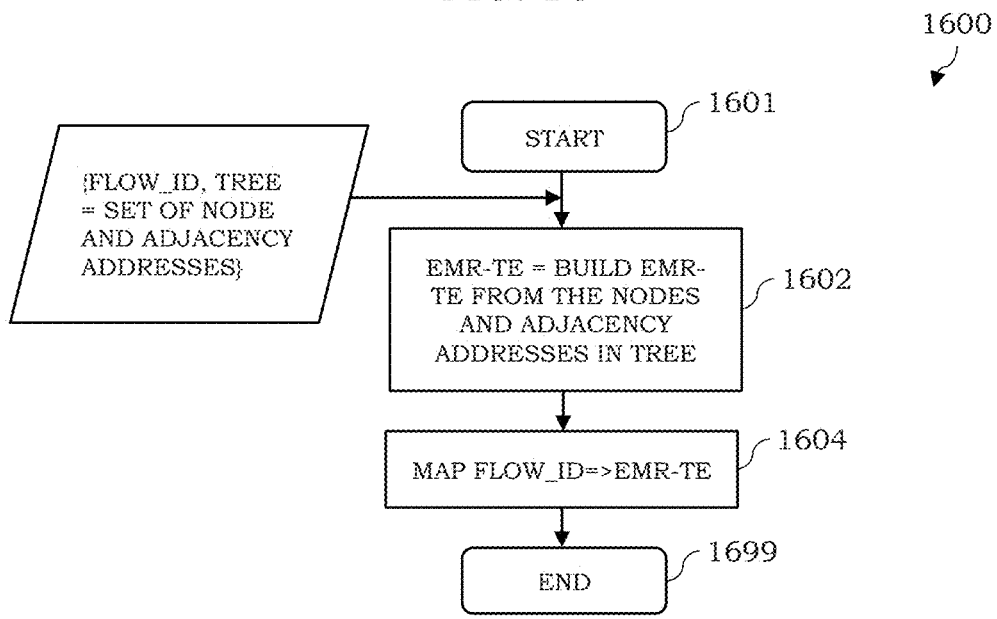
FIG. 16 depicts an example embodiment of a method for use by an ingress router for processing an explicit path tree response from a controller.

FIG. 16 depicts an example embodiment of a method for use by an ingress router for processing an explicit path tree response from a controller. It will be appreciated that, although primarily presented as being performed serially, at least a portion of the functions of method 1600 may be performed contemporaneously or in a different order than as presented with respect to FIG. 16. The inputs to the method 1600 include the local identifier of a multicast flow in the ingress router and the explicit multicast tree with its set of node and adjacencies. At block 1601, the method 1600 begins. Block 1602 builds the EMR-TE from the node and adjacency addresses in the explicit path tree. Block 1602 proceeds to block 1604. Block 1604 maps the EMR-TE to the multicast flow identifier. That means any packet to be multicast by the ingress router for the flow will use this EMR-TE. This completes the configuration of explicit path tree for the multicast flow. At block 1699, the method 1600 ends.

Figure 17:
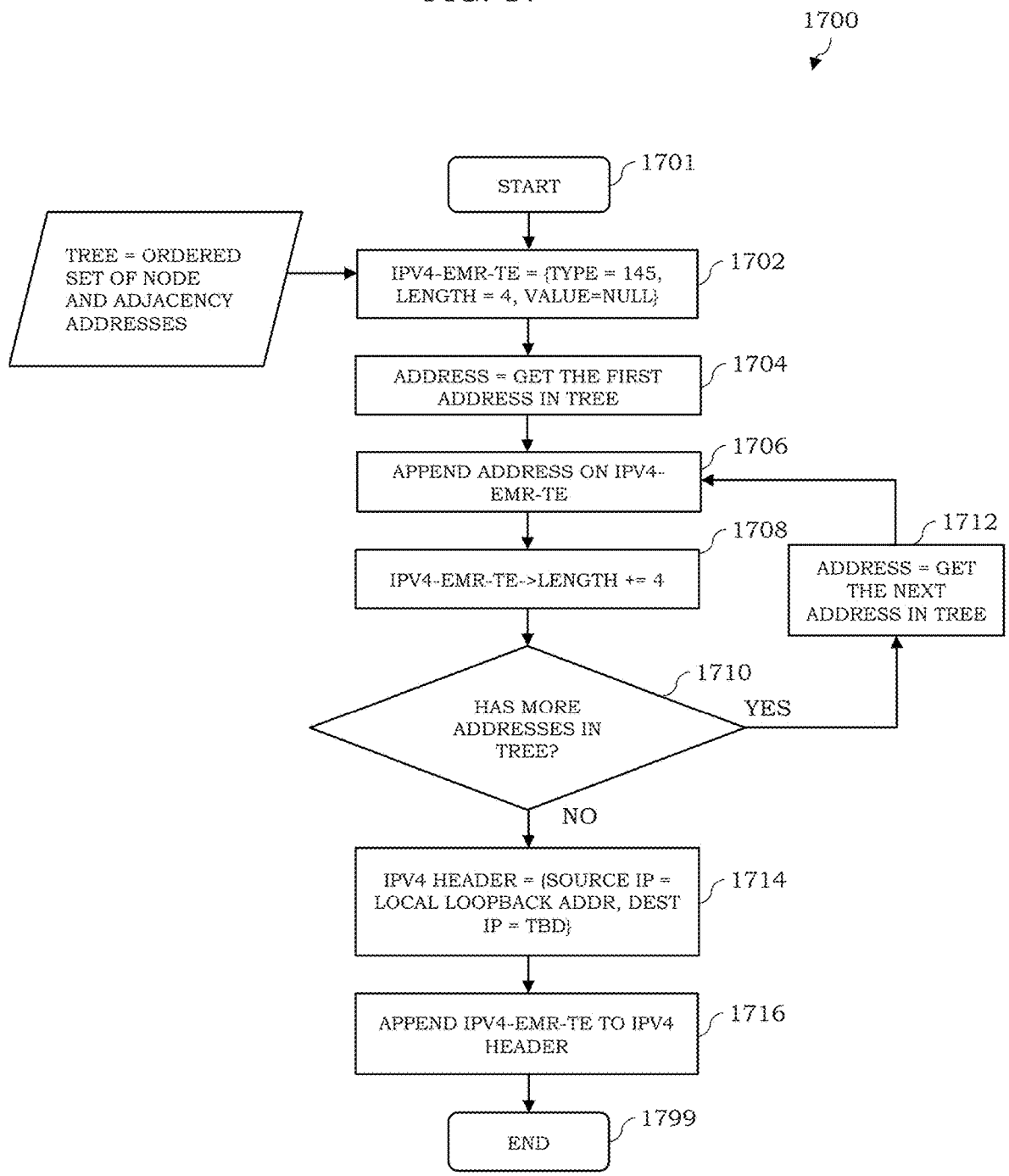
FIG. 17 depicts an example embodiment of a method for building an EMR-TE for a set of node and adjacency addresses in an explicit path tree.

FIG. 17 depicts an example embodiment of a method for building an EMR-TE for a set of node and adjacency addresses in an explicit path tree. It will be appreciated that the method 1700 of FIG. 17 may be used as block 1602 of FIG. 16. It will be appreciated that, for purposes of clarity, the method 1700 is described within the context of example embodiments in which the EMR-TE is encoded as an IPv4 Option and, accordingly, that the method 1700 may be adapted for supporting example embodiments in which the EMR-TE is encoded using other forms of encoding as presented herein. It will be appreciated that, although primarily presented as being performed serially, at least a portion of the functions of method 1700 may be performed contemporaneously or in a different order than as presented with respect to FIG. 17. The input to the method 1700 includes the ordered set of node and adjacency addresses of an explicit path tree. At block 1701, the method 1700 begins. Block 1702 initializes an empty IPv4-EMR-TE Option with Type as 145 and Length as four (fixed header length of 4 octets that includes the Type, Length, Flags, and Reserved fields), and the method 1700 then proceeds to block 1704. Block 1704 retrieves the first address from the ordered set of node and adjacency addresses in the explicit path tree, and the method 1700 then proceeds to block 1706. Block 1706 appends the address to the IPv4-EMR-TE Option, and the method 1700 then proceeds to block 1708. Block 1708 increments the value of the Length field of the IPv4-EMR-TE Option by four octets (that accounts for the address appended in block 1706), and the method 1700 then proceeds to block 1710. Block 1710 checks if there are more addresses in the ordered set of node and adjacency addresses in the explicit path tree. If there are more addresses in the ordered set of node and adjacency addresses in the explicit path tree, then the method 1700 proceeds to block 1712, otherwise the method 1700 proceeds to block 1714. Block 1712 retrieves the next address in the ordered set of node and adjacency addresses in the tree, and the method 1700 then returns to block 1706 to repeat the subsequent blocks for the next address. Block 1714, which is reached when all addresses in the ordered set of node and adjacency addresses have been appended to the IPv4 EMR-TE Option, builds an IPv4 Header with Source IP Address as a local loopback IP address (it is noted that the Destination IP address field is to be filled at the time of forwarding the EMR-TE packet(s) based on the next-hop address of the respective EMR Packet(s)), and the method 1700 then proceeds to block 1716. Block 1716 appends the IPv4-EMR-TE Option to the IPv4 Header to build the EMR-TE Packet. At block 1799, the method 1700 ends.

Figure 18:
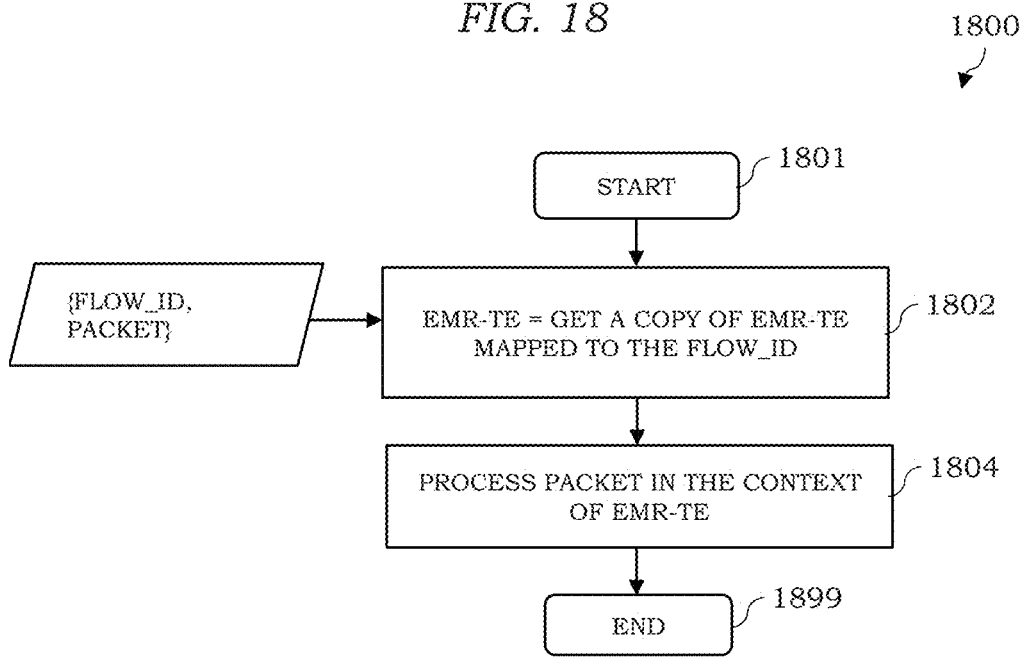
FIG. 18 depicts an example embodiment of a method for originating an EMR-TE packet at an ingress router.

FIG. 18 depicts an example embodiment of a method for originating an EMR-TE packet at an ingress router. It will be appreciated that the method 1800 of FIG. 18 may be used by an ingress router to send a packet for a multicast flow as EMR-TE packet across the stateless IP multicast TE domain. It will be appreciated that, for purposes of clarity, the method 1800 is described within the context of example embodiments in which the EMR-TE is encoded as an IPv4 Option and, accordingly, that the method 1800 may be adapted for supporting example embodiments in which the EMR-TE is encoded using other forms of encoding as presented herein. It will be appreciated that, although primarily presented as being performed serially, at least a portion of the functions of method 1800 may be performed contemporaneously or in a different order than as presented with respect to FIG. 18. The inputs to the method 1800 include the locally assigned identifier of the multicast flow and a packet of the flow. At block 1801, the method 1800 begins. Block 1802 looks up the EMR-TE mapped to the multicast flow by its identifier and makes a copy of the EMR-TE, and the method 1800 then proceeds to block 1804. Block 1804 sends the packet to the stateless IP multicast TE domain in the context of the EMR-TE. At block 1899, the method 1800 ends.

Figure 19A:
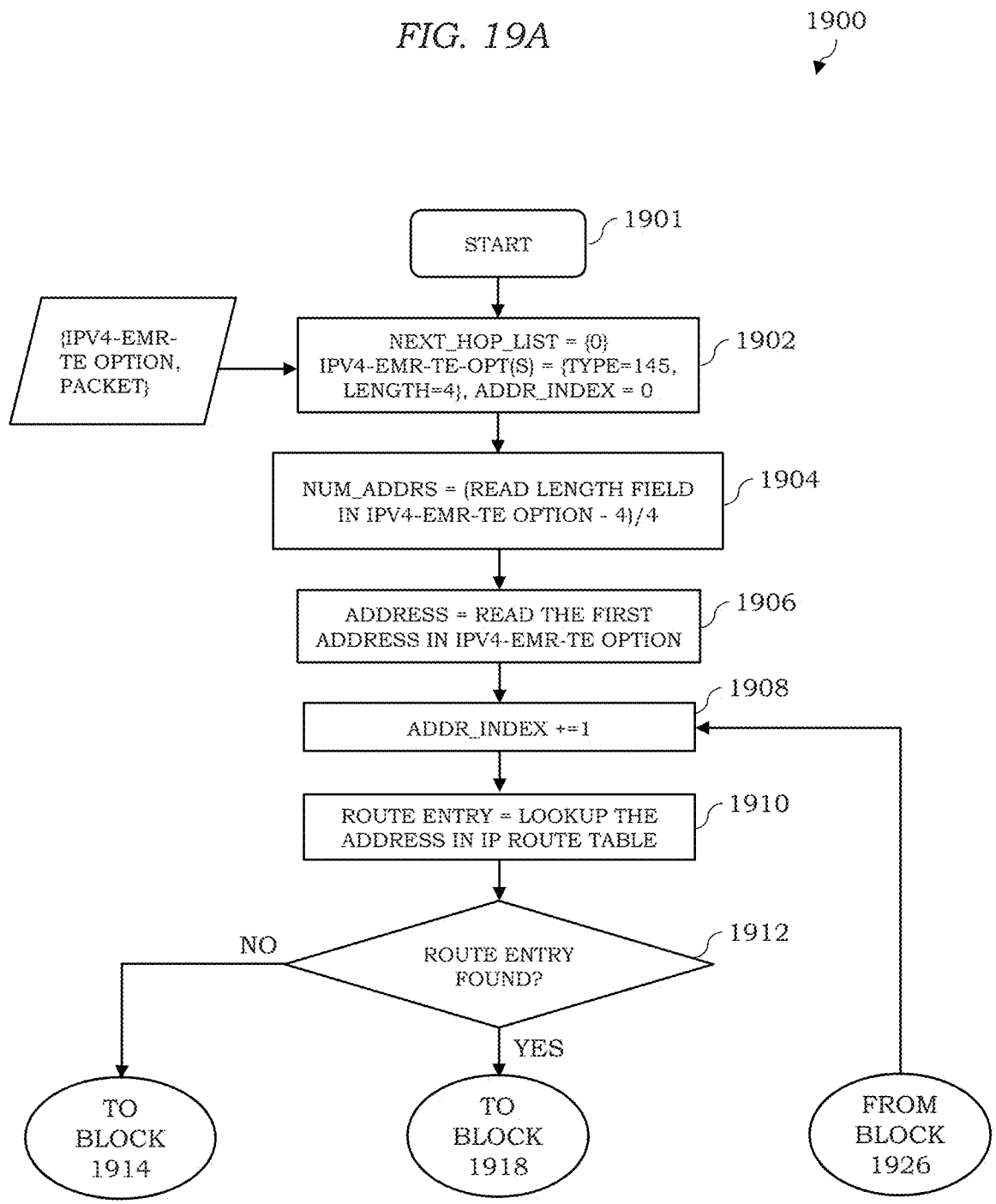
FIGS. 19A-19B depict an example embodiment of a method for processing a packet in the context of an EMR-TE.
Figure 19B:
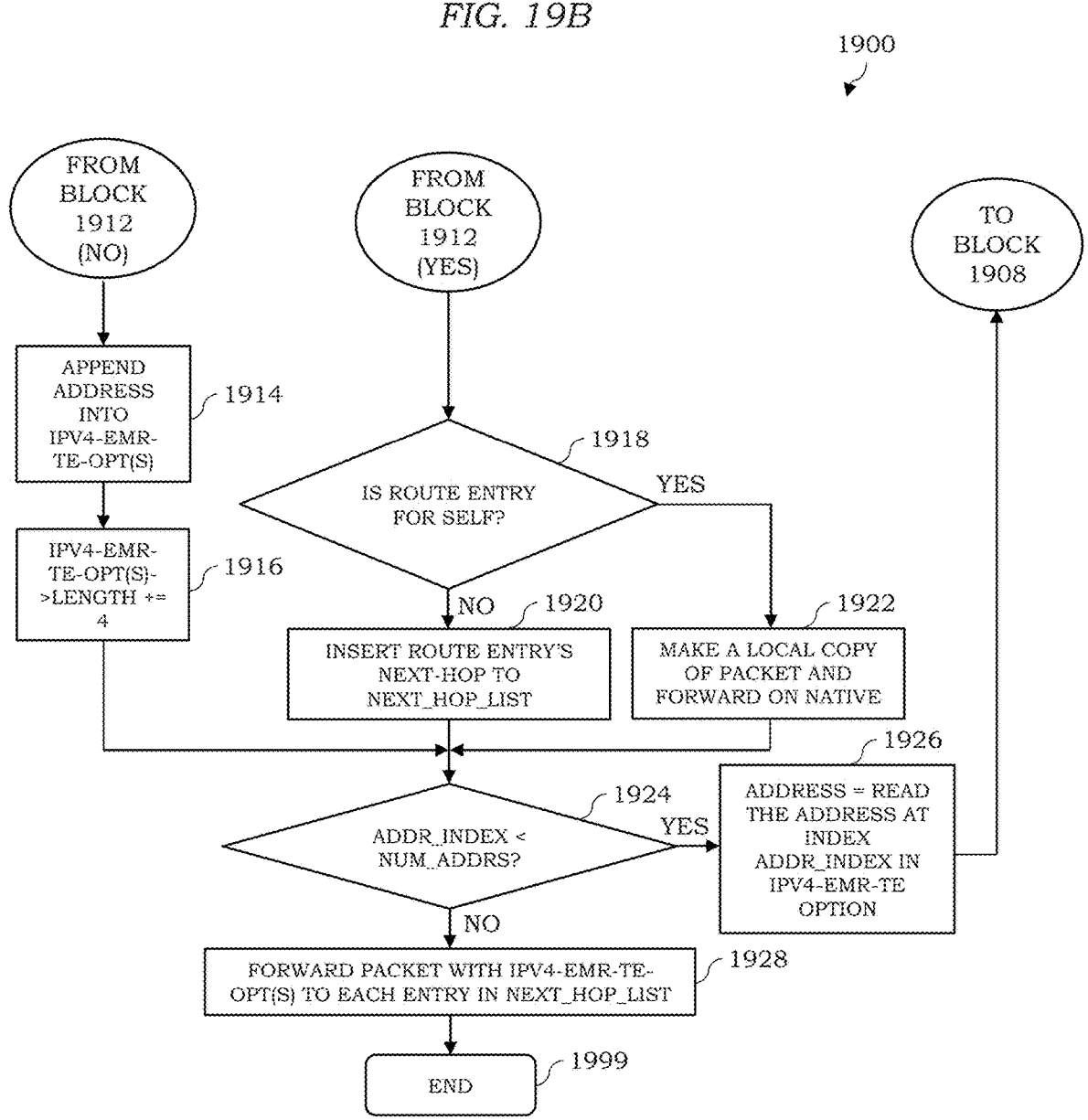

FIGS. 19A-19B depicts an example embodiment of a method for processing a packet in the context of an EMR- TE. It will be appreciated that the method 1900 of FIGS. 19A-19B may be used as block 1804 of FIG. 18. It will be appreciated that the method 1900 of FIGS. 19A-19B may be used by any routers of the stateless IP multicast TE domain (e.g., ingress, transit, bud, or leaf). It will be appreciated that, for purposes of clarity, the method 1900 is described within the context of example embodiments in which the EMR-TE is encoded as an IPv4 Option and, accordingly, that the method 1900 may be adapted for supporting example embodiments in which the EMR-TE is encoded using other forms of encoding as presented herein. It will be appreciated that, although primarily presented as being performed serially, at least a portion of the functions of method 1900 may be performed contemporaneously or in a different order than as presented with respect to FIGS. 19A-19B. The inputs to the method 1900 include the EMR-TE and the packet. At block 1901, the method 1900 begins. Block 1902 performs initializations. Block 1902 initializes an empty list of route next-hops (Next_Hop_List) which is to be used to temporarily track next hop entries for the addresses in the EMR-TE that has forward connected adjacency states in this router. Block 1902 initializes an empty EMR-TE which is denoted here as IPv4-EMR-TE-Opt(S). IPv4-EMR-TE-Opt(S) would be included in the forwarded packet(s), so it is qualified with "S" to indicate "to send". The IPv4-EMR-TE-Opt(S) will eventually include all of the addresses of the input IPv4-EMR-TE Option, except the ones that identify a forward connected adjacency or the node itself. Block 1902 also initializes an index to read the addresses of the input IPv4-EMR-TE Option (Addr_Index) to 0, as the addresses are read in the order staring from the first one. Block 1904 reads the Length field from the input IPv4-EMR-TE Option to determine the number of addresses (Length—4/4), which accounts for the number of addresses to be processed, and the method 1900 then proceeds to block 1906. Block 1906 reads the first address in the IPv4-EMR-TE Option, and the method 1900 then proceeds to block 1908. Block 1908 increments Addr_Index, as one address has been read out from IPv4-EMR-TE Option, and the method 1900 then proceeds to block 1910. Block 1910 looks up the address in the IP Route Table, and the method 1900 then proceeds to block 1912. Block 1912 checks if a matching route entry has been found. If a matching route entry has not been found, then the method 1900 proceeds to block 1914, otherwise the method 1900 proceeds to block 1918. Block 1918 checks if the next-hop of the route entry indicates "self", which means that this router is an egress router of the packet. If this router is an egress router of the packet, the method 1900 then proceeds to block 1922, otherwise the method 1900 proceeds to 1920. Block 1922 makes a copy of the input packet and forwards the copy based on the native header in the packet copy, and the method 1900 then proceeds to block 1924. Block 1920 inserts the next-hop of the route entry into the temporal list of route next-hops (Next_Hop_List), and the method 1900 then proceeds to block 1924. Block 1914 appends the address into IPv4-EMR-TE-Opt(S), and the method 1900 then proceeds to block 1916. Block 1916 increments the value of the Length field in IPv4-EMR-TE-Opt(S) by four to account for the appended address, and the method 1900 then proceeds to block 1924. Block 1924 checks if there are more addresses in input IPv4-EMR-TE Option to be processed, which is indicated by Addr_Index having a value lesser than Num_Addrs. If the input IPv4-EMR-TE Option has more addresses, then the method 1900 proceeds to block 1926, otherwise the method 1900 proceeds to block 1928. Block 1928 reads the next address (i.e., address at Addr_Index) in the input IPv4-EMR-TE Option, and the method 1900 then returns to block 1908 to repeat the subsequent blocks for this address. Block 1928, which is reached when all non-local addresses have been pushed onto IPv4-EMR-TE-Opt(S), walks through the entries in the temporal list of next-hops, and for each entry, makes a copy of the packet, pushes the appropriate IPv4 Header with IPv4-EMR-TE-Opt(S) onto the packet copy, and forwards the resultant EMR-TE packet on the adjacency of that entry. At block 1999, the method 1900 ends.

FIG. 20 depicts an example embodiment of a method for forwarding of an EMR-TE packet. It will be appreciated that the method 2000 of FIG. 20 may be used as block 1928 of FIGS. 19A-19B. It will be appreciated that, for purposes of clarity, the method 2000 is described within the context of example embodiments in which the EMR-TE is encoded as an IPv4 Option and, accordingly, that the method 2000 may be adapted for supporting example embodiments in which the EMR-TE is encoded using other forms of encoding as presented herein. It will be appreciated that, although primarily presented as being performed serially, at least a portion of the functions of method 2000 may be performed contemporaneously or in a different order than as presented with respect to FIG. 20. The inputs to the method 2000 include the packet, the EMR-TE to be pushed onto the packet (here, an IPv4-EMR-TE Option), and the list of next-hop entries (Next_Hop_List) to which to forward a copy of the EMR-TE packet. At block 2001, the method 2000 begins. Block 2002 retrieves the first next hop from the Next_Hop_List, and the method 2000 then proceeds to block 2004. Block 2004 makes a copy of the input packet, and the method 2000 proceeds to block 2006. Block 2006 pushes a copy of the input IPv4-EMR-TE Option on top of the packet copy, and the method 2000 then proceeds to block 2008. Block 2008 pushes an IPv4 Header onto the packet, which results in the EMR-TE packet to the next hop. It sets the fields of the IPv4 Header in EMR-TE as needed. For example, the Length field is updated to (size of IPv4 Header+IPv4-EMR-TE-Option→Length+size of packet), the Protocol field is set to type of packet, and so forth. It also sets the TTL field in the IPv4 Header as required. For example, an implementation may choose to set the TTL to the maximum depth of the explicit path tree. The method 2000 then proceeds to block 2010. Block 2010 forwards the EMR-TE packet to the next hop, and the method 2000 then proceeds to block 2012. Block 2012 checks if there are additional entries in Next_Hop_List. If there are no more entries in the Next_Hop_List, then the method 2000 proceeds to block 2099 where the method 2000 ends, otherwise the method 2000 proceeds to block 2014. Block 2014 retrieves the next entry in Next_Hop_List, and then the method 2000 returns to block 2004 to repeat the subsequent blocks for the next entry. At block 2099, the method 2000 ends.

It is noted that, performing blocks to 1902 to 1924 in method 1900 of FIGS. 19A-19B on each packet for a multicast flow may be sub-optimal, as the operations therein are not specific to a packet, but, rather, are for the multicast flow in general. Therefore, in at least some example embodiments, the blocks to 1902 to 1924 in method 1900 of FIGS. 19A-19B may be performed in continuation to the method 1700 of FIG. 17 to prebuild the list of next hop entries and the EMR-TE to be sent on forwarded packets. Then, the multicast flow identifier can be mapped to the tuple {EMR-TE, list of next hop entries}. For every packet on the multicast flow, the ingress router will look up the {EMR-TE, list of next hop entries} mapped to the flow identifier and would execute the method 2000 of FIG. 20 to forward/ replicate the packet. It will be appreciated that various other modifications and enhancements are contemplated.

Figure 21:
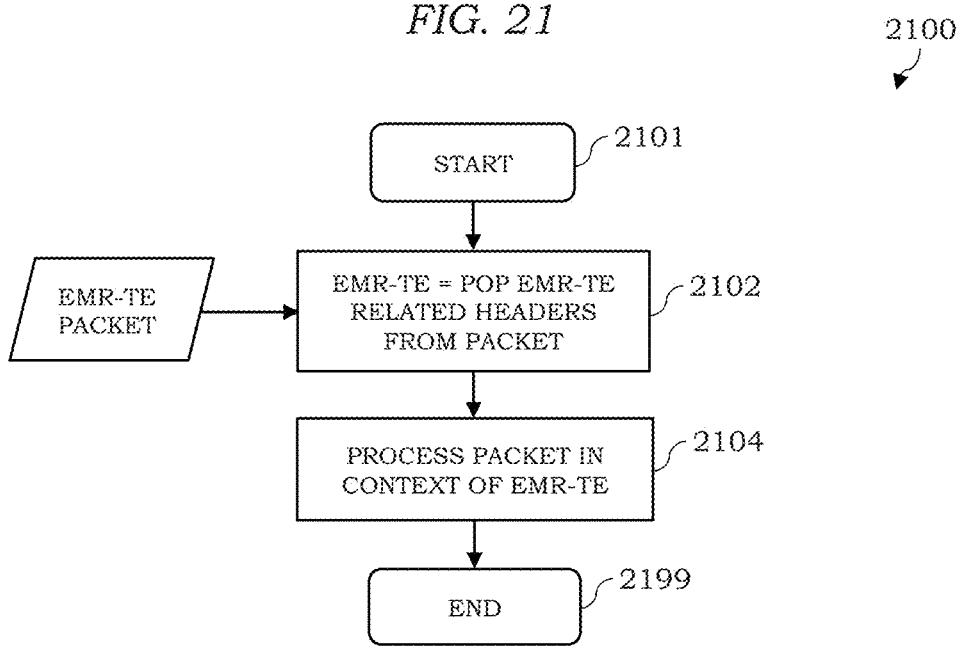
FIG. 21 depicts an example embodiment of a method for processing of an EMR-TE packet by a transit, bud, or egress router.

FIG. 21 depicts an example embodiment of a method for processing of an EMR-TE packet by a transit, bud, or egress router. It will be appreciated that, although primarily presented as being performed serially, at least a portion of the functions of method 2100 may be performed contemporaneously or in a different order than as presented with respect to FIG. 21. The input to the method 2100 includes an EMR-TE packet. At block 2101, the method 2100 begins. Block 2702 pops the EMR-TE related headers from the EMR-TE packet. For example, if the EMR-TE is encoded as an IPv4-EMR-TE Option, then the IPv4 Header and the IPv4-EMR-TE Option are popped. The method 2100 then proceeds to block 2104. Block 2104 processes the packet in the context of the EMR-TE. Block 2104 may be implemented by method 1900 of FIGS. 19A-19B, which implements the common processing part for any router in a stateless IP multicast TE domain. At block 2199, the method 2100 ends.

Figure 22:
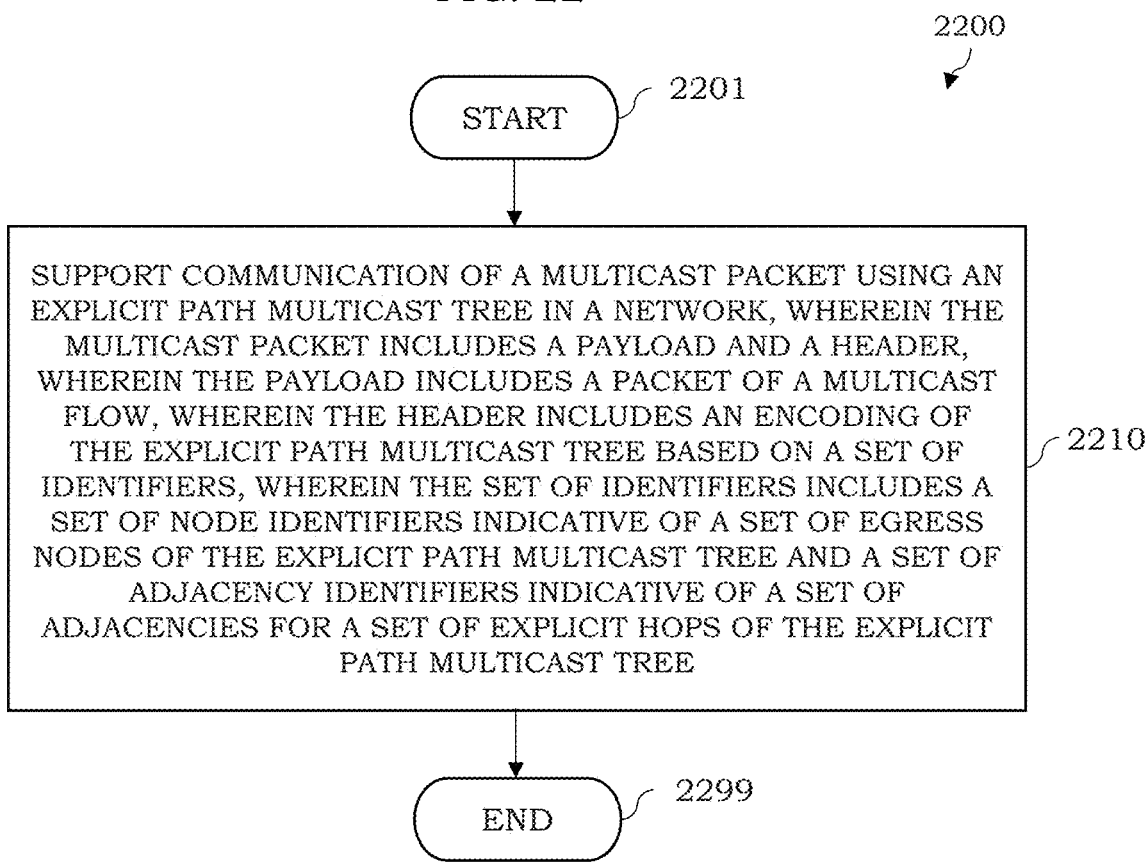
FIG. 22 depicts an example embodiment of a method for use by a communication device to support stateless multicast with traffic engineering.

FIG. 22 depicts an example embodiment of a method for use by a communication device to support stateless multicast with traffic engineering. It will be appreciated that, although primarily presented as being performed serially, at least a portion of the functions of method 2200 may be performed contemporaneously or in a different order than as presented with respect to FIG. 22. At block 2201, the method 2200 begins. At block 2210, support communication of a multicast packet using an explicit path multicast tree in a network, wherein the multicast packet includes a payload and a header, wherein the payload includes a packet of a multicast flow, wherein the header includes an encoding of the explicit path multicast tree based on a set of identifiers, wherein the set of identifiers includes a set of node identifiers indicative of a set of egress nodes of the explicit path multicast tree and a set of adjacency identifiers indicative of a set of adjacencies for a set of explicit hops of the explicit path multicast tree. At block 2299, the method 2200 ends. It will be appreciated that various functions presented herein with respect to FIGS. 1-21 may be incorporated within the context of method 2200 of FIG. 22.

Various example embodiments for supporting stateless multicast in a stateless IP multicast TE domain may provide various advantages or potential advantages. For example, various example embodiments for supporting stateless multicast in a stateless IP multicast TE domain may enable support for multicast flows having strict QoS/service level agreements (SLAs) associated therewith. For example, various example embodiments for supporting stateless multicast in a stateless IP multicast TE domain may enable support for use of stateless IP multicast for various types of applications in which use of TE may be necessary or beneficial (e.g., IPTV applications where the video channels may require strict QoS as per SLAs, datacenters and webscale networks where certain communications may need to meet strict QoS, BGP-based VPNs where certain multicast flows within VPNs may require strict QoS guarantees, and so forth). For example, various example embodiments for supporting stateless multicast in a stateless IP multicast TE domain may enable more efficient use of network resources (e.g., by enabling use of explicit paths which may include alternate paths that might otherwise remain unutilized or underutilized in the absence of TE where the multicast flows to the same set of egress routers might otherwise follow the same path while agnostic of the QoS requirements of the multicast flows). Various example supporting stateless multicast in a stateless IP multicast TE domain may provide various other advantages or potential advantages.

Figure 23:
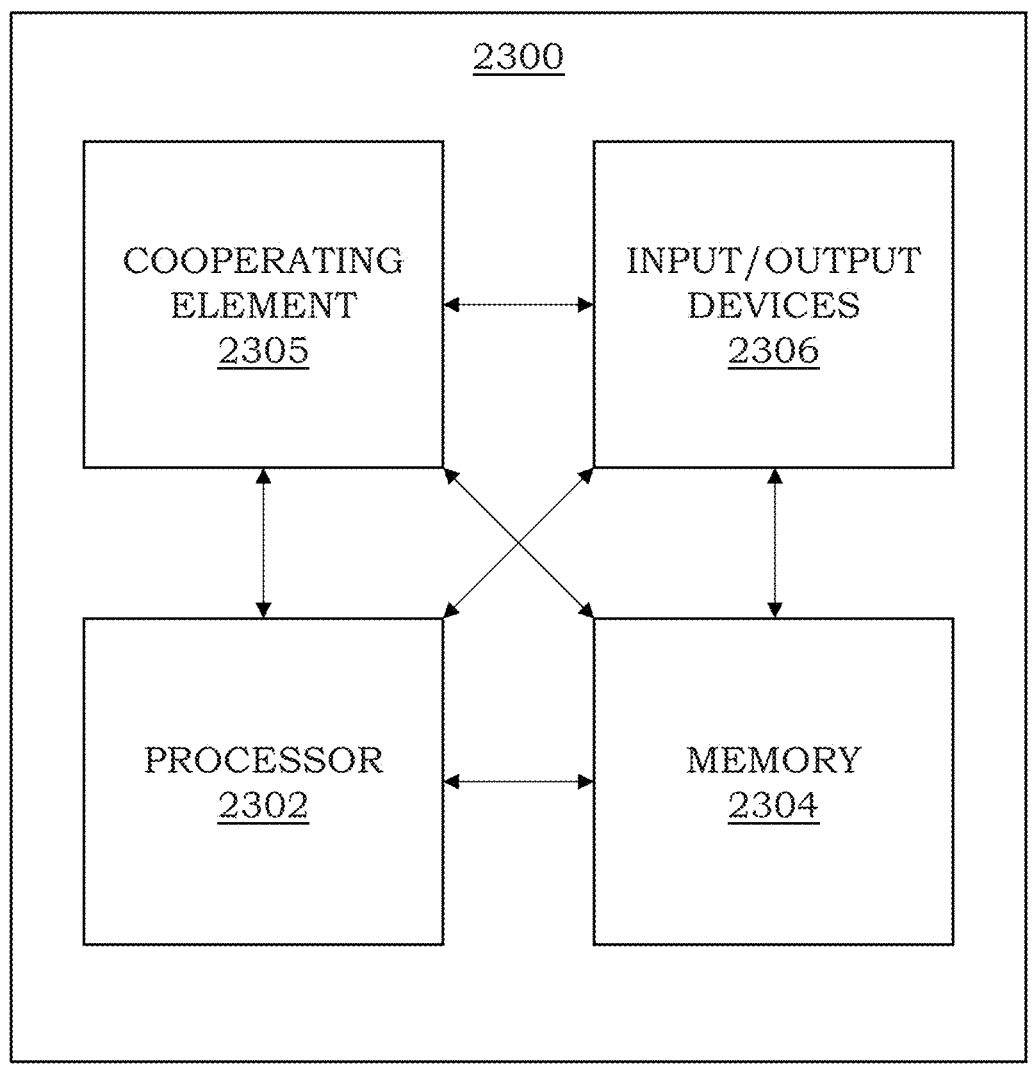
FIG. 23 depicts an example embodiment of a computer suitable for use in performing various functions presented herein.

FIG. 23 depicts an example embodiment of a computer suitable for use in performing various functions presented herein.

The computer 2300 includes a processor 2302 (e.g., a central processing unit (CPU), a processor, a processor having a set of processor cores, a processor core of a processor, or the like) and a memory 2304 (e.g., a random access memory, a read only memory, or the like). The processor 2302 and the memory 2304 may be communicatively connected. In at least some example embodiments, the computer 2300 may include at least one processor and at least one memory including a set of instructions which, when executed by the at least one processor, cause the computer 2300 to perform various functions presented herein.

The computer 2300 also may include a cooperating element 2305. The cooperating element 2305 may be a hardware device. The cooperating element 2305 may be a process that can be loaded into the memory 2304 and executed by the processor 2302 to implement various functions presented herein (in which case, for example, the cooperating element 2305 (including associated data structures) can be stored on a non-transitory computer-readable storage medium, such as a storage device or other suitable type of storage element (e.g., a magnetic drive, an optical drive, or the like)).

The computer 2300 also may include one or more input/output devices 2306. The input/output devices 2306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2300 may represent a general architecture and functionality suitable for implementing functional elements described herein, portions of functional elements described herein, or the like, as well as various combinations thereof. For example, computer 2300 may provide a general architecture and functionality that is suitable for implementing one or more elements presented herein, such as network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions that, when executed by the at least one processor, cause the apparatus to:
      support communication of a multicast packet using an explicit path multicast tree in a network, wherein the multicast packet includes a payload and a header, wherein the payload includes a packet of a multicast flow, wherein the header includes an encoding of the explicit path multicast tree based on a set of addresses, wherein the set of addresses includes a set of node addresses of a set of egress nodes of the explicit path multicast tree and a set of adjacency addresses of a set of adjacencies for a set of explicit hops of the explicit path multicast tree.

2. The apparatus of claim 1, wherein the set of addresses includes a set of Internet Protocol (IP) addresses.

3. The apparatus of claim 1, wherein the set of addresses includes an ordered list of addresses in which the node addresses and the adjacency addresses are ordered according to occurrence along the explicit path multicast tree.

4. The apparatus of claim 1, wherein the set of addresses includes a first list of addresses including the adjacency addresses and a second list of addresses including the node addresses.

5. The apparatus of claim 4, wherein the encoding of the explicit path multicast tree includes a type field encoding an indication that the header includes the encoding of the explicit path multicast tree.

6. The apparatus of claim 1, wherein the adjacencies include forward connected adjacencies.

7. The apparatus of claim 1, wherein the encoding of the explicit path multicast tree is based on an IPv4 Header Option, an IPv4 Shim Header, an IPv6 Extension Header, or an IPv6 Shim Header.

8. The apparatus of claim 1, wherein the explicit path multicast tree is configured to support a set of quality-of-service (QoS) requirements of the multicast flow.

9. The apparatus of claim 1, wherein, to support communication of the multicast packet, the instructions, when executed by the at least one processor, cause the apparatus to:
   receive, by an ingress node of the explicit path multicast tree, the packet of the multicast flow;
   generate, by the ingress node based on the packet of the multicast flow, the multicast packet; and
   send, by the ingress node toward a next-hop node, the multicast packet.

10. The apparatus of claim 9, wherein, to generate the multicast packet, the instructions, when executed by the at least one processor, cause the apparatus to:
    determine the explicit path multicast tree;
    generate the encoding of the explicit path multicast tree; and
    associate the encoding of the explicit path multicast tree with the packet of the multicast flow to form the multicast packet.

11. The apparatus of claim 1, wherein, to support communication of the multicast packet, the instructions, when executed by the at least one processor, cause the apparatus to:
    receive, by a router, the multicast packet; and
    process, by the router based on a determination that one of the node addresses in the set of node addresses identifies the router, the multicast packet to provide the packet of the multicast flow for processing at the router.

12. The apparatus of claim 11, wherein, to process the multicast packet to provide the packet of the multicast flow for processing at the router, the instructions, when executed by the at least one processor, cause the apparatus to:
    make a copy of the multicast packet;
    remove the header from the copy of the multicast packet to recover the packet of the multicast flow; and
    provide the packet of the multicast flow to a local context of the router.

13. The apparatus of claim 1, wherein, to support communication of the multicast packet, the instructions, when executed by the at least one processor, cause the apparatus to:
    receive, by a router, the multicast packet;
    process, by the router based on a determination that one of the adjacency addresses in the set of adjacency addresses identifies a forward connected adjacency at the router, the multicast packet to form a second multicast packet for the forward connected adjacency; and
    forward, by the router toward the forward connected adjacency, the second multicast packet.

14. The apparatus of claim 13, wherein, to process the multicast packet to form the second multicast packet for the forward connected adjacency, the instructions, when executed by the at least one processor, cause the apparatus to:
    make a copy of the multicast packet; and
    remove, from the copy of the multicast packet, the one of the adjacency addresses in the set of adjacency addresses that identifies the forward connected adjacency at the router.

15. The apparatus of claim 1, wherein the set of addresses further includes a gateway address of a gateway node of a sub-domain of the network and a tree address of a tree from the gateway router to one or more egress nodes of the explicit path multicast tree.

16. The apparatus of claim 15, wherein the gateway address and the tree address form a tuple within the header of the multicast packet.

17. The apparatus of claim 15, wherein, to support communication of the multicast packet, the instructions, when executed by the at least one processor, cause the apparatus to:
    receive, by a router, the multicast packet;
    process, by the router based on a determination that the router is the gateway router, the multicast packet to form a second multicast packet; and
    forward, by the router in the sub-domain, the second multicast packet.

18. The apparatus of claim 17, wherein, to process the multicast packet, the instructions, when executed by the at least one processor, cause the apparatus to:
  determine, by the router based on the tree address, one or more node addresses indicative of the respective one or more egress nodes of the explicit path multicast tree; and
  include, by the router within the second packet, the one or more node addresses indicative of the respective one or more egress nodes of the explicit path multicast tree.

19. The apparatus of claim 1, wherein the packet of the multicast flow includes a packet of a multicast flow overlay.

20. The apparatus of claim 19, wherein the multicast flow overlay includes at least one of an Internet Protocol (IP) overlay, an IP—Virtual Private Network (IP-VPN) overlay, a Multiprotocol Label Switching (MPLS) overlay, a Border Gateway Protocol—Ethernet Virtual Private Network (BGP-EVPN) overlay, or a Virtual Private Local Area Network (LAN) Service (VPLS) overlay.

21. An apparatus, comprising:
  at least one processor; and
  at least one memory storing instructions that, when executed by the at least one processor, cause the apparatus to:
    support communication of a multicast packet using an explicit path multicast tree in a network, wherein the multicast packet includes a payload and a header, wherein the payload includes a packet of a multicast flow, wherein the header includes an encoding of the explicit path multicast tree based on a set of identifiers, wherein the set of identifiers includes a set of node identifiers indicative of a set of egress nodes of the explicit path multicast tree and a set of adjacency identifiers indicative of a set of adjacencies for a set of explicit hops of the explicit path multicast tree, wherein the explicit path multicast tree includes an Internet Protocol Traffic Engineering (IP-TE) tree configured to support a set of quality-of-service requirements of the multicast flow.

22. A method, comprising:
supporting communication of a multicast packet using an explicit path multicast tree in a network, wherein the multicast packet includes a payload and a header, wherein the payload includes a packet of a multicast flow, wherein the header includes an encoding of the explicit path multicast tree based on a set of addresses, wherein the set of addresses includes a set of node addresses of a set of egress nodes of the explicit path multicast tree and a set of adjacency addresses of a set of adjacencies for a set of explicit hops of the explicit path multicast tree.

* * * * *